US011545717B2

(12) United States Patent
Haruki et al.

(10) Patent No.: US 11,545,717 B2
(45) Date of Patent: Jan. 3, 2023

(54) ENERGY STORAGE APPARATUS

(71) Applicant: GS Yuasa International Ltd., Kyoto (JP)

(72) Inventors: Kazuo Haruki, Kyoto (JP); Hiroyasu Koyama, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 1109 days.

(21) Appl. No.: 16/071,386

(22) PCT Filed: Jan. 27, 2017

(86) PCT No.: PCT/JP2017/002991
§ 371 (c)(1),
(2) Date: Jul. 19, 2018

(87) PCT Pub. No.: WO2017/131182
PCT Pub. Date: Aug. 3, 2017

(65) Prior Publication Data
US 2021/0175586 A1 Jun. 10, 2021

(30) Foreign Application Priority Data

Jan. 29, 2016 (JP) .............................. JP2016-016713

(51) Int. Cl.
*H01M 50/298* (2021.01)
*H01M 50/209* (2021.01)
(Continued)

(52) U.S. Cl.
CPC ....... *H01M 50/298* (2021.01); *H01M 50/209* (2021.01); *H01M 50/271* (2021.01);
(Continued)

(58) Field of Classification Search
CPC ............. H01M 50/271; H01M 50/284; H01M 50/291; H01M 50/293; H01M 50/298;
(Continued)

(56) References Cited

U.S. PATENT DOCUMENTS

| 2013/0095359 | A1 | 4/2013 | Yoshioka et al. |
| 2014/0370341 | A1 | 12/2014 | Oshiba et al. |
| 2018/0233930 | A1* | 8/2018 | Chiyajo .............. H01M 10/482 |

FOREIGN PATENT DOCUMENTS

| CN | 203631621 U | 6/2014 |
| JP | 2012-174507 A | 9/2012 |

(Continued)

OTHER PUBLICATIONS

EPO website (www.espacenet.com) machine translation of the detailed description of JP 2014-072084A. (Year: 2014).*

(Continued)

*Primary Examiner* — Gregg Cantelmo
(74) *Attorney, Agent, or Firm* — McGinn I.P. Law Group, PLLC

(57) ABSTRACT

An energy storage apparatus, which includes a plurality of energy storage devices, includes: a bus bar which connects the energy storage devices to each other; a wiring; a wiring positioning member, which includes a plurality of guide portions; and a connector holding member, wherein a part of the plurality of guide portions positions the connecting holding member, and wherein an other part of the plurality of guide portions forms a path of the wiring.

12 Claims, 12 Drawing Sheets

(51) Int. Cl.
*H01M 50/293* (2021.01)
*H01M 50/507* (2021.01)
*H01M 50/51* (2021.01)
*H01M 50/291* (2021.01)
*H01M 50/284* (2021.01)
*H01M 50/271* (2021.01)
*H01M 50/517* (2021.01)

(52) U.S. Cl.
CPC ....... *H01M 50/284* (2021.01); *H01M 50/291* (2021.01); *H01M 50/293* (2021.01); *H01M 50/507* (2021.01); *H01M 50/51* (2021.01); *H01M 50/517* (2021.01)

(58) Field of Classification Search
CPC ... H01M 50/507; H01M 50/51; H01M 50/517
See application file for complete search history.

(56) References Cited

FOREIGN PATENT DOCUMENTS

| | | | |
|---|---|---|---|
| JP | 2013-084594 A | | 5/2013 |
| JP | 2013-106400 A | | 5/2013 |
| JP | 2014072084 A | * | 4/2014 |
| JP | 2015-002078 A | | 1/2015 |
| JP | 2015-195131 A | | 11/2015 |
| JP | 2015-195137 A | | 11/2015 |
| WO | WO 2013/069756 A1 | | 5/2013 |

OTHER PUBLICATIONS

International Search Report (ISR) (PCT Form PCT/ISA/210), in PCT/JP2017/002991, dated Apr. 4, 2017.

* cited by examiner

ENERGY STORAGE APPARATUS

TECHNICAL FIELD

The present invention relates to an energy storage apparatus which includes energy storage devices.

BACKGROUND ART

Conventionally, there has been known an energy storage apparatus (battery module) which includes energy storage devices (battery cells) and where a wiring is positioned so as to electrically monitor the energy storage devices (see patent document 1, for example).

PRIOR ART DOCUMENT

Patent Document

Patent Document 1: JP-A-2012-174507

SUMMARY OF THE INVENTION

Problems to be Solved by the Invention

However, the above-mentioned conventional energy storage apparatus has a following drawback. In positioning a wiring, it is necessary to provide members for forming a path of the wiring, members for attaching connectors and the like and hence, the configuration of the energy storage apparatus becomes complicated.

The present invention has been made to overcome the above-mentioned drawback, and it is an object of the present invention to provide an energy storage apparatus which can simplify the configuration necessary for positioning a wiring.

Means for Solving the Problems

To achieve the object, an energy storage apparatus according to an aspect of the present invention, which includes a plurality of energy storage devices, includes: a bus bar which connects the energy storage devices to each other; a wiring; a wiring positioning member which includes a plurality of guide portions; and a connector holding member, wherein a part of the plurality of guide portions positions the connecting holding member, and wherein an other part of the plurality of guide portions forms a path of the wiring.

Advantages of the Invention

According to an energy storage apparatus of the present invention, the configuration necessary for positioning a wiring can be simplified.

MODE FOR CARRYING OUT THE INVENTION

Figure 1:
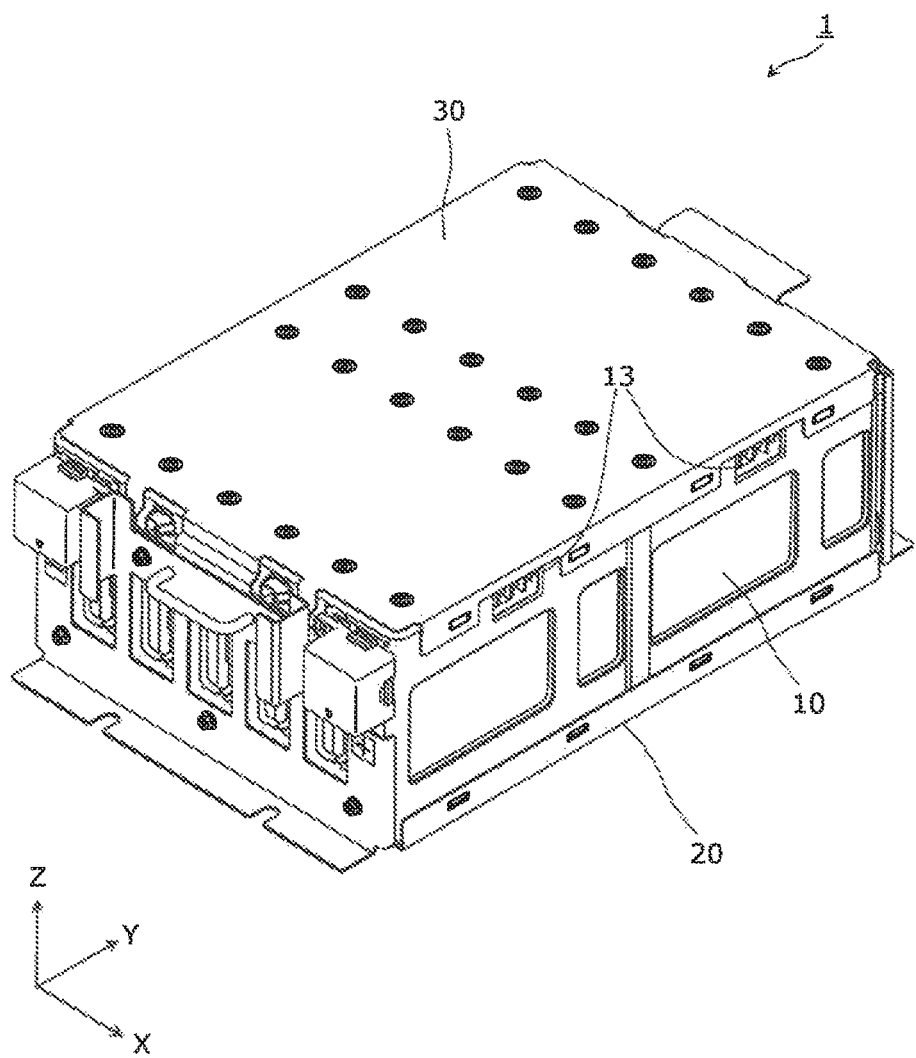
FIG. 1 is a perspective view showing an external appearance of an energy storage apparatus according to an embodiment of the present invention.

To achieve the object, an energy storage apparatus according to an aspect of the present invention, which includes a plurality of energy storage devices, includes: a bus bar which connects the energy storage devices to each other; a wiring; a wiring positioning member which includes a plurality of guide portions; and a connector holding member, wherein a part of the plurality of guide portions positions the connecting holding member, and wherein an other part of the plurality of guide portions forms a path of the wiring.

With such a configuration, the energy storage apparatus includes the wiring positioning member which includes the plurality of guide portions and the connector holding member, and a part of the plurality of guide portions positions the connector holding member, and an other part of the plurality of guide portions forms the path of the wiring. That is, the guide portion has both function of forming the path of the wirings and function of positioning the connector holding member. Accordingly, due to the formation of the guide portion, it is unnecessary to form two kinds of portions consisting of a portion for forming the path of the wiring and a portion for positioning the connector holding member and hence, the configuration necessary for positioning the wiring can be simplified.

The plurality of guide portions may include a first guide portion and a second guide portion, the wiring positioning member ay include: a first wiring positioning member which includes the first guide portion; and a second wiring positioning member which includes the second guide portion, and a path of the wiring may be formed by the first guide portion and the second guide portion which are opposite to each other with a boundary of the first wiring positioning member and the second wiring positioning member interposed therebetween.

With such a configuration, the path of the wiring is formed by the first guide portion of the first wiring positioning member and the second guide portion of the second wiring positioning member. That is, with the use of the guide portions of two wiring positioning members, wiring can be easily made to pass through between two wiring positioning members without using additional members.

Each of the plurality of guide portions may include a plurality of projections which projects upward.

With such a configuration, the guide portion can position the connector holding member or can form the path of the wiring by the plurality of projections.

The connector holding member may include: a first connector holding member with which a connector is attached; a second connector holding member, which has same a shape as the first connector holding member, has an opening, to which a connector is attachable, closed with a cover member.

With such a configuration, the energy storage apparatus includes the first connector holding member with which the connector is attached, and the second connector holding member which has the same shape as the first connector holding member and where the connector attaching opening is closed. That is, with the use of the connector holding member having the same shape also on a side where the connector is not positioned, the configuration of the energy storage apparatus can be simplified.

The first connector holding member may be positioned by a guide portion which is provided at one end portion of the wiring positioning member, and the second connector holding member may be positioned by a guide portion which is provided at an other end portion of the wiring positioning member.

With such a configuration, the first connector holding member is positioned by the guide portion which is provided at one end portion of the wiring positioning member, and the second connector holding member is positioned by the guide portion which is provided at an other end portion of the wiring positioning member. That is, by imparting function of positioning the first connector holding member to one guide portion and by imparting function of positioning the second connector holding member to an other guide portion, the configuration of the energy storage apparatus can be simplified.

A lid body which is disposed on the wiring positioning member may be further provided, and a tip of at least one of the plurality of guide portions and the lid body may be in contact or adjacently face to each other.

With such a configuration, a tip of the guide portion and the lid body are in contact or adjacently face to each other and hence, it is possible to prevent the wiring positioned by the guide portion from jumping out from the guide portion and being removed from the guide portion.

The wiring positioning member may be a pressing member which is disposed on the energy storage device and presses the energy storage device downward.

With such a configuration, by using a wiring positioning member as the pressing member which presses the energy storage device, the configuration of the energy storage apparatus can be simplified.

A through hole may be formed in the connector holding member, at least one of the plurality of guide portions being inserted through the trough hole.

With such a configuration, the through hole through which the guide portion is inserted is formed in the connector holding member and hence, the guide portion can be easily attached to the connector holding member.

An outer surface of the connector holding member and an outer surface of an outer case of the energy storage apparatus may be disposed coplanar.

With such a configuration, the outer surface of the connector holding member and the outer surface of the outer case are disposed coplanar and hence, a cover which covers the outer surface of the connector holding member and the outer surface of the outer case can be easily mounted.

The plurality of guide portions may be disposed at a rotationally symmetric position.

With such a configuration, the plurality of guide portions are disposed at a rotationally symmetric position and hence, in mounting the member to which the guide portion is provided, an error in determining a mounting direction can be suppressed.

A first circuit board to which a wiring is connected, the wiring being connected to the connector; and a second circuit board to which a wiring is connected, the wiring being connected to the energy storage device may be further provided, the first circuit board and the second circuit board may be disposed apart from each other.

With such a configuration, the first circuit board to which the wiring which is connected to the energy storage device is connected and the second circuit board to which the wiring which is connected to the connector is connected are disposed apart from each other. In such a configuration, the wiring which is connected to the energy storage device is a high-voltage wiring such as a voltage measurement use wiring, and the wiring which is connected to the connector is a low-voltage wiring such as a communication use wiring (control use wiring). Accordingly, the second circuit board to which the low-voltage wiring is connected is disposed apart from the first circuit board to which the high-voltage wiring is connected and hence, the low-voltage wiring can be easily insulated from the high-voltage wiring whereby the configuration for positioning the wiring can be simplified.

The first circuit board and the second circuit board may be disposed at members which are different from each other and included in the wiring positioning member.

With such a configuration, the second circuit board is disposed at the member different from the member at which the first circuit board is disposed and hence, the low-voltage wiring can be insulated from the high-voltage wiring more easily.

Hereinafter, an energy storage apparatus according to embodiments of the present invention is described with reference to drawings. The embodiments described hereinafter are preferred specific examples of the present invention. In the embodiments described hereinafter, numerical values, shapes, materials, constitutional elements, the arrangement positions and connection states of the constitutional elements and the like are merely examples, and these are not intended to be used for limiting the present invention. Further, out of the constitutional elements in the embodiments described hereinafter, the constitutional elements which are not described in independent claims describing an uppermost concept are described as arbitrary constitutional elements. Respective illustrations in the attached drawings are schematically shown, and there are not always described strictly accurately in size or the like.

Further, in the respective illustrations, identical or similar constitutional elements are given the same symbols.

Embodiment

First, the configuration of an energy storage apparatus 1 is described.

Figure 2:
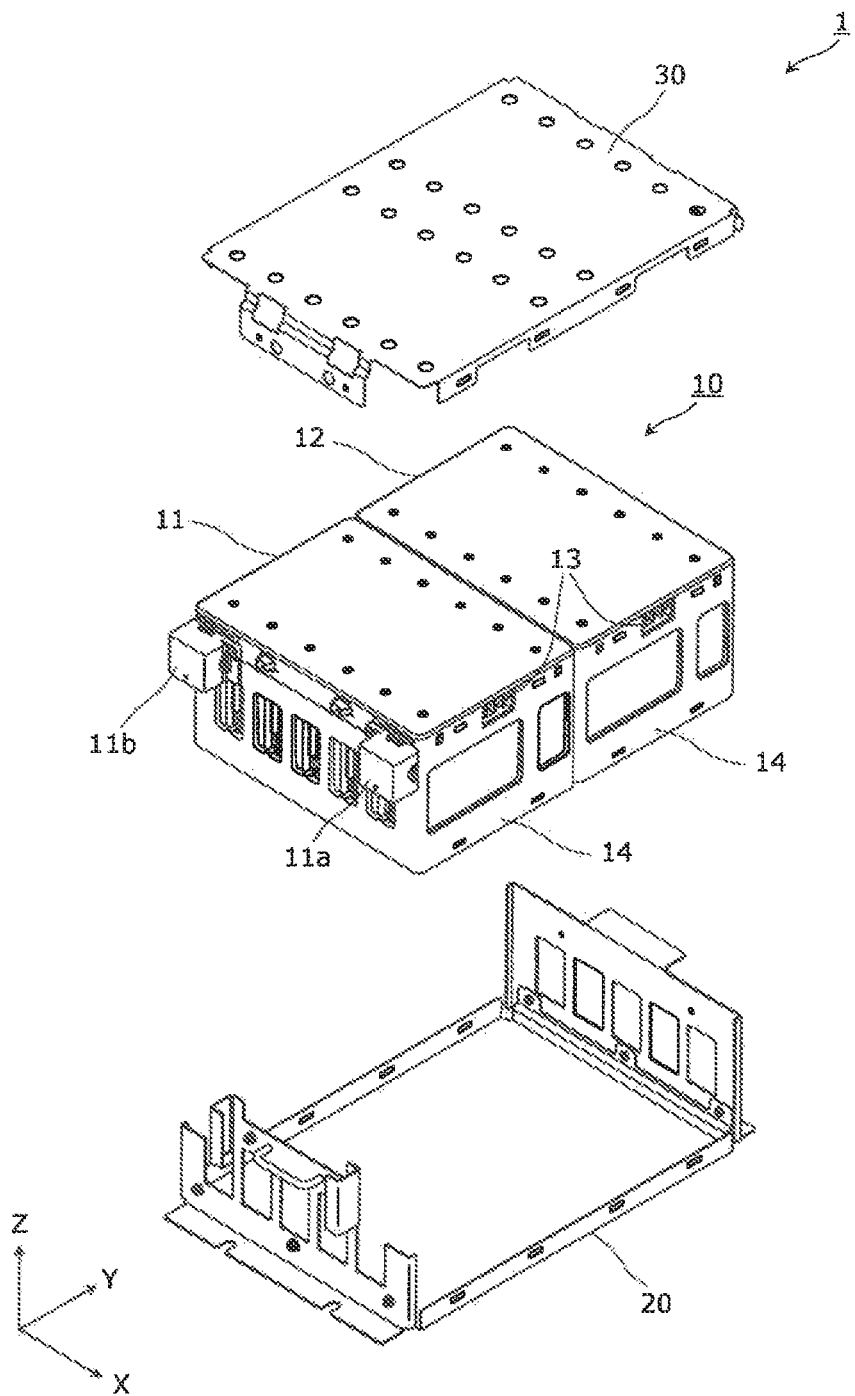
FIG. 2 is an exploded perspective view showing respective constitutional elements in a state where the energy storage apparatus according to the embodiment of the preset invention is disassembled.

FIG. 1 is a perspective view showing an external appearance of the energy storage apparatus 1 according to an embodiment of the present invention. FIG. 2 is an exploded perspective view showing respective constitutional elements in a state where the energy storage apparatus 1 according to the embodiment of the preset invention is disassembled.

In these drawings, a Z axis direction is indicated as a vertical direction, and the description will be made hereinafter assuming the Z axis direction as the vertical direction. However, in an actual use state, there may also be a case where the Z axis direction does not agree with the vertical direction and hence, the Z axis direction is not limited to the vertical direction. The same definition is applicable also to drawings succeeding to FIG. 2.

The energy storage apparatus 1 is a device which can charge electricity from the outside and can discharge electricity to the outside. For example, the energy storage apparatus 1 is a battery module used as a power source for an automobile, a power source for electronic equipment, a power source for storing electricity or the like.

As shown in these drawings, the energy storage apparatus 1 includes: a module group 10 having two unit modules 11, 12; a lower side connecting member 20; and an upper side connecting member 30. The energy storage apparatus 1 may be configured such that the energy storage apparatus 1 includes only one unit module or three or more unit modules.

The module group 10 includes two unit modules 11, 12 arranged parallel to each other in a Y axis direction. A positive electrode external terminal 11a and a negative electrode external terminal 11b are mounted on the unit module 11. The energy storage apparatus 1 charges electricity from the outside and discharges electricity to the outside through the positive electrode external terminal 11a and the negative electrode external terminal 11b.

The unit modules 11, 12 are respectively formed of a rectangular module where one or more energy storage devices are housed in a module case 14. The unit modules 11, 12 respectively have substantially the same configuration. All energy storage devices disposed in the inside of the unit modules 11, 12 are connected in series by electrically connecting the positive electrode terminals and the negative electrode terminals of the energy storage devices in the inside of the unit modules 11, 12. The detailed configuration of the module group 10 is described later.

A discharge portion 13 for discharging a gas released from gas release valves of the energy storage devices is formed on the unit modules 11, 12 respectively. The discharge portion 13 is a rectangular opening formed in end portions of the unit modules 11, 12 respectively in an X axis direction (an arrangement direction of the energy storage devices). In the drawing, the discharge portion 13 is formed in the end portion in a direction orthogonal to a longitudinal direction of the energy storage apparatus 1 (to be more specific, a lateral direction orthogonal to the longitudinal direction). That is, the discharge portions 13 are disposed on a side where the positive electrode external terminal 11a and the negative electrode external terminal 11b are not disposed so that the discharge portions 13 do not influence external terminal sides of the unit modules 11, 12.

The lower side connecting member 20 and the upper side connecting member 30 are members which connect two unit modules 11, 12, wherein the lower side connecting member 20 is a connecting member on a lower side and the upper side connecting member 30 is a connecting member on an upper side. That is, the unit modules 11, 12 are connected to each other by fixing the unit modules 11, 12 to each other in such a manner that the unit modules 11, 12 are clamped between the lower side connecting member 20 and the upper side connecting member 30.

Tb be more specific, the lower side connecting member 20 and the upper side connecting member 30 are respectively formed of a planar member made of metal, for example. With such a configuration, the unit modules 11, 12 can be strongly fixed to each other in a stable manner. Module cases 14 which two unit modules 11, 12 have respectively are mounted on the lower side connecting member 20.

Next, the detailed configuration of the module group 10 is described.

Figure 3:
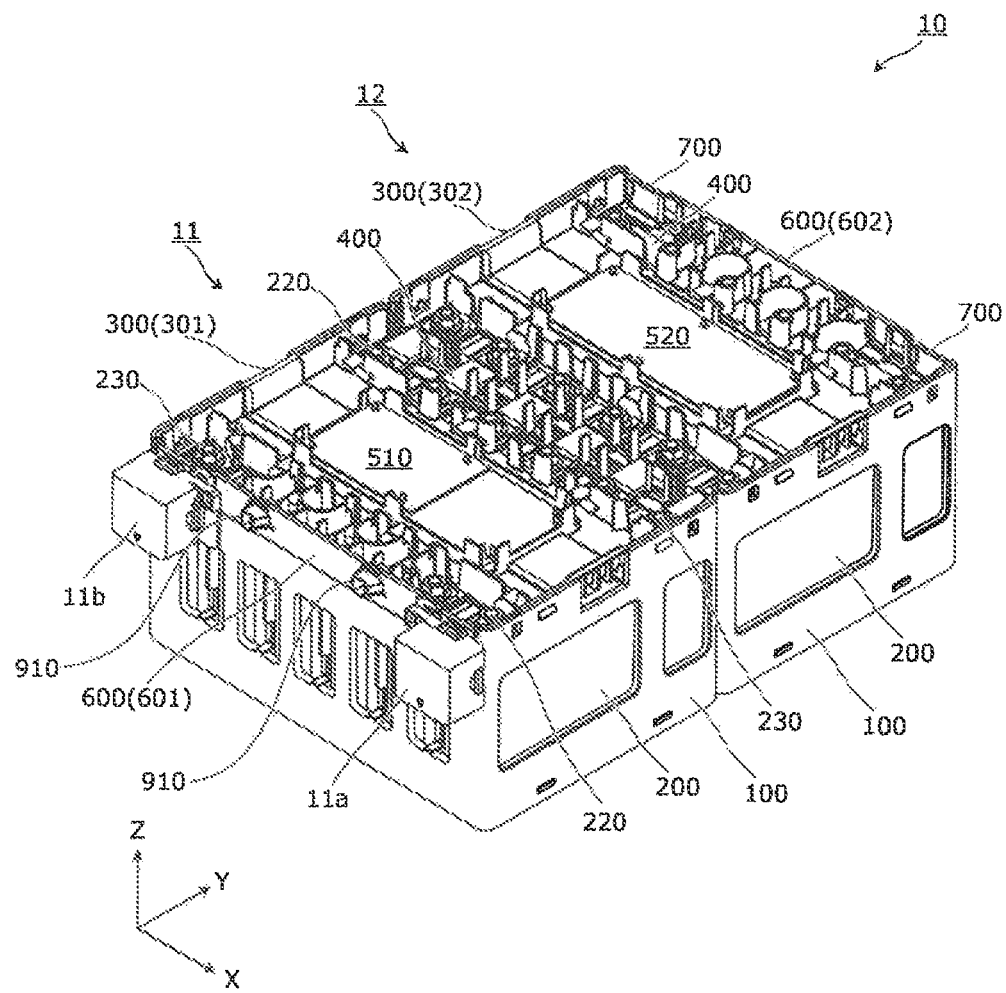
FIG. 3 is a perspective view showing respective constitutional elements in the inside of a module group according to the embodiment of the present invention.
Figure 4:
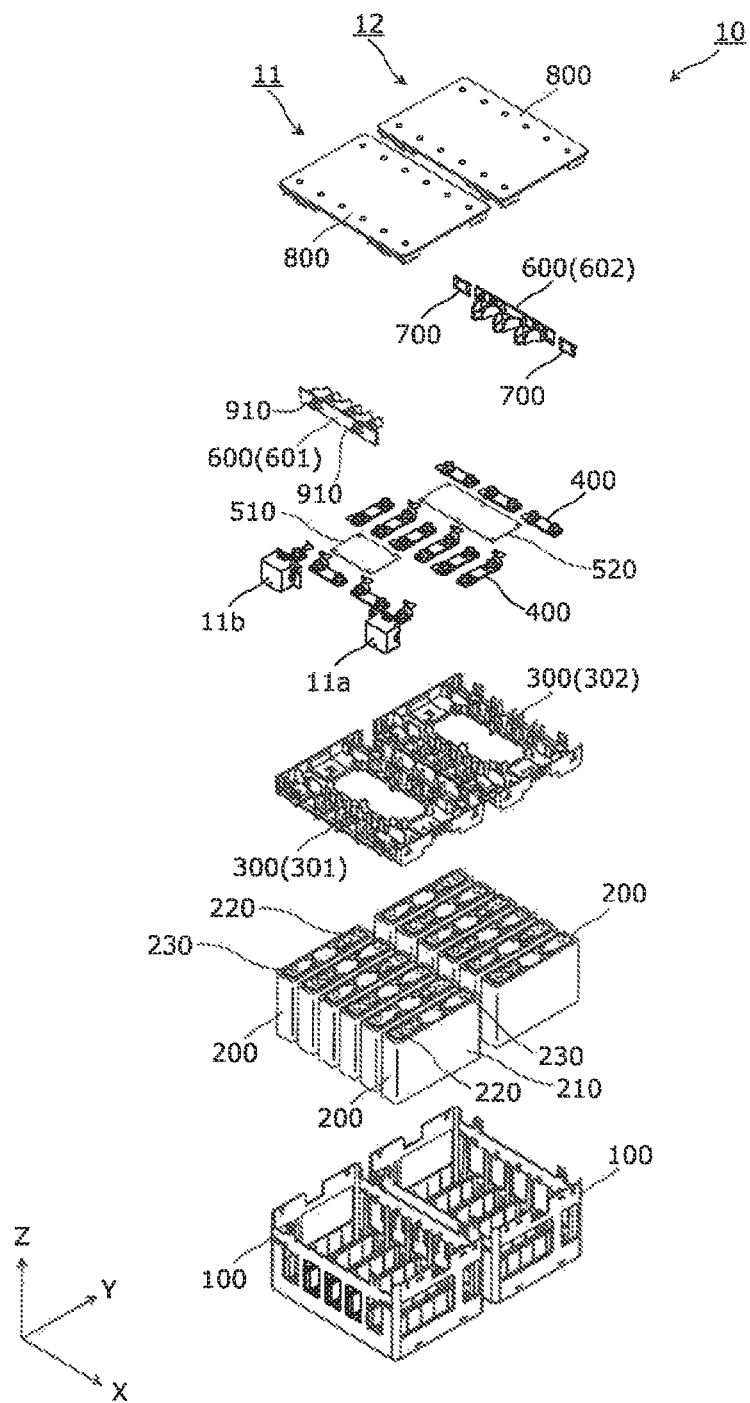
FIG. 4 is an exploded perspective view showing respective constitutional elements in a state where the module group according to the embodiment of the present invention is disassembled.

FIG. 3 is a perspective view showing respective constitutional elements in the inside of the module group 10 according to the embodiment of the present invention. To be more specific, FIG. 3 is a view showing the internal configuration by removing a lid body 800 from the module group 10. FIG. 4 is an exploded perspective view showing respective constitutional elements in a state where the module group 10 according to the embodiment of the present invention is disassembled.

As shown in these drawings, the unit modules 11, 12 which the module group 10 has respectively include: the module case 14 formed of a case body 100 and the lid body 800 (see FIG. 2); and a plurality of energy storage devices 200 (six energy storage devices 200 in this embodiment) and a wiring positioning member 300 housed in the module case 14. In the inside of the module case 14, bus bars 400 are disposed such that the bus bar 400 strides over the unit modules 11, 12.

A first circuit board 510 and a connector holding member 600 (first connector holding member 601) are disposed on the wiring positioning member 300 (first wiring positioning member 301) of the unit module 11. A second circuit board 520, a connector holding member 600 (second connector holding member 602) and closing members 700 are disposed on the wiring positioning member 300 (second wiring positioning member 302) of the unit module 12. Wiring which connects between the first circuit board 510, the second circuit board 520, the connector holding member 600, and the electrode terminals of the energy storage device 200 is disposed on the wiring positioning member 300. However, such a configuration is omitted in the drawing.

The module case 14 formed of the case body 100 and the lid body 800 is a rectangular (box-shaped) container which forms an outer case of the unit module 11, 12. The module case 14 arranges the plurality of energy storage device 200, circuit boards (the first circuit board 510, the second circuit board 520) and the like at predetermined positions, and protects the plurality of energy storage device 200, the circuit boards and the like from an impact or the like. The module case 14 is made of an insulating material such as a resin which may be polycarbonate as an example. The module case 14 protects the energy storage devices 200, the circuit boards and the like from coming into contact with an external metal member or the like.

In this embodiment, the case body 100 is a bottomed rectangular cylindrical member which forms a body of the module case 14. The lid body 800 is a member which forms a lid of the module case 14, and is a flat rectangular member which closes an opening formed on an upper portion of the case body 100. To be more specific, in the inside of the case body 100, the plurality of energy storage devices 200, the wiring positioning members 300, the bus bars 400 and the like are disposed in this order, the lid body 800 is disposed above the wiring positioning members 300, and an opening portion of the case body 100 is closed by the lid body 800.

The energy storage device 200 is a secondary battery (battery cell) which can charge electricity and discharge electricity. To be more specific, the energy storage device 200 is a nonaqueous electrolyte secondary battery such as a lithium ion secondary battery. The energy storage device 200 is not limited to the nonaqueous electrolyte secondary battery, and may be a secondary battery other than the nonaqueous electrolyte secondary battery or may be a capacitor. Further, the energy storage device 200 may be a primary battery which can use stored electricity even when a user does not charge the battery. In this embodiment, six energy storage devices 200 are arranged parallel to each other in an X axis direction and are housed in the inside of the module case 14. The number of energy storage devices 200 housed in the inside of the module case 14 may be the number other than six. For example, only one energy storage device 200 may be housed in the inside of the module case 14. Further, the number of energy storage devices 200 housed in the inside of the unit module 11 and the number of energy storage devices 200 housed in the inside of the unit module 12 may differ from each other.

To be more specific, the energy storage device 200 includes a container 210, a positive electrode terminal 220 and a negative electrode terminal 230. Although an electrode assembly (also referred to as an energy storage element or a power generating element), a positive electrode current collector, a negative electrode current collector, and an electrolyte solution and the like are housed in the inside of the container 210, the illustration of these constitutional elements is omitted.

The container 210 is formed of: a bottomed rectangular cylindrical casing body made of metal; and a container lid portion made of metal which closes an opening of the case body. Although a material of the container 210 is not particularly limited, it is preferable to use weldable metal such as stainless steel, for example. The positive electrode terminal 220 is an electrode terminal electrically connected to a positive electrode of the electrode assembly through the positive electrode current collector, and the negative electrode terminal 230 is an electrode terminal electrically connected to a negative electrode of the electrode assembly through the negative electrode current collector.

The bus bar 400 is a conductive member made of metal or the like which is disposed above the wiring positioning member 300, and electrically connects the plurality of energy storage devices 200 to each other. To be more specific, the bus bar 400 connects, with respect to the energy storage devices 200 disposed adjacently to each other, the positive electrode terminal 220 or the negative electrode terminal 230 of one energy storage device 200 and the negative electrode terminal 230 or the positive electrode terminal 220 of the other energy storage device 200 to each other.

To be more specific, the positive electrode terminal 220 of the energy storage device 200 disposed on a positive electrode external terminal 11*a* side is connected to the positive electrode external terminal 11*a*, and the negative electrode terminal 230 of the energy storage device 200 is connected to the positive electrode terminal 220 of the adjacently disposed energy storage device 200 via the bus bar 400.

Similarly, the negative electrode terminal 230 of the energy storage device 200 disposed on a negative electrode external terminal 11*b* side is connected to the negative electrode external terminal 11*b*, and the positive electrode terminal 220 of the energy storage device 200 is connected to the negative electrode terminal 230 of the adjacently disposed energy storage device 200 via the bus bar 400. The positive electrode terminal 220 or the negative electrode terminal 230 of other energy storage device 200 is connected to the negative electrode terminal 230 or the positive electrode terminal 220 of the adjacently disposed energy storage device 200 via the bus bar 400.

The wiring positioning member 300 is a flat rectangular member disposed above the plurality of energy storage devices 200, and a wiring connected to the plurality of energy storage device 200 is positioned by the wiring positioning member 300. The wiring positioning member 300 is made of an insulating material such as a resin, for example. The wiring positioning member 300 is also a member which restricts the positions of the plurality of energy storage devices 200 in the inside of the case body 100 so as to fix the plurality of energy storage devices 200 in the case body 100. That is, the wiring positioning member 300 is fitted in the case body 100 and also functions as a pressing member (inner lid) which presses the plurality of energy storage devices 200 from above to below.

In this embodiment, the wiring positioning member 300 includes a first wiring positioning member 301 and a second wiring positioning member 302 having the same shape. The first wiring positioning member 301 is a wiring positioning member provided to the unit module 11. A first circuit board 510 is placed on the first wiring positioning member 301, and a first connector holding member 601 is mounted on the first wiring positioning member 301. The second wiring positioning member 302 is a wiring positioning member provided to the unit module 12. A second circuit board 520 is placed on the second wiring positioning member 302, and a second connector holding member 602 and a closing member 700 are mounted on the second wiring positioning member 302.

In this manner, the wiring positioning member 300 also functions as a placing base on which the circuit boards (the first circuit board 510, the second circuit board 520) are placed and, at the same time, as a mounting base on which connector holding members 600 (a first connector holding member 601, a second connector holding member 602) and a closing member 700 are mounted. The detailed configuration of the wiring positioning member 300 is described later.

The first circuit board 510 is a rectangular circuit board (communication circuit board) on which a circuit for performing communication with external equipment is mounted. To be more specific, the first circuit board 510 is connected to a connector 910 held by the first connector holding member 601 by a wiring (communication use wiring), and the connector 910 is connected with the external equipment. With such a configuration, the first circuit board 510 performs communication with the external equipment.

In this embodiment, out of the unit modules 11 and 12, the first circuit board 510 is disposed on the unit module 11 which is a unit module having a connector holding member (first connector holding member 601) which holds the connector. To be more specific, the first circuit board 510 is disposed on the first wiring positioning member 301 of the unit module 11 and is disposed to be covered with the lid body 800 of the unit module 11. To be still more specific, the first circuit board 510 is disposed, on the first wiring positioning member 301, in a space between the positive electrode terminals 220 and the negative electrode terminals 230 of the respective plurality of energy storage devices 200 which the unit module 11 includes. With such a configuration, the first circuit board 510 is sandwiched between the first wiring positioning member 301 and the lid body 800 of the unit module 11 and hence, the first circuit board 510 is protected by the first wiring positioning member 301 and the lid body 800.

The second circuit board 520 is a rectangular circuit board on which a circuit for acquiring and monitoring a charge state and a discharge state (a battery state such as a voltage and temperature) of the plurality of energy storage devices 200 which the module group 10 includes is mounted (a monitoring circuit board). To be more specific, the second circuit board 520 is connected to the electrode terminals of the plurality of energy storage devices 200 via the wiring (voltage measurement use wiring and temperature measurement use wiring), and acquires and monitors a voltage, a temperature and the like of the energy storage device 200.

In this embodiment, out of the unit modules 11 and 12, the second circuit board 520 is disposed on the unit module 12 which is a unit module having a connector holding member (second connector holding member 602) which does not hold the connector. To be more specific, the second circuit board 520 is disposed on the second wiring positioning member 302 of the unit module 12 and is disposed to be covered with the lid body 800 of the unit module 12. To be still more specific, the second circuit board 520 is disposed, on the second wiring positioning member 302, in a space between the positive electrode terminals 220 and the negative electrode terminals 230 of the respective plurality of energy storage devices 200 which the unit module 12 includes. With such a configuration, the second circuit board 520 is sandwiched between the second wiring positioning member 302 and the lid body 800 of the unit module 12 and hence, the second circuit board 520 is protected by the second wiring positioning member 302 and the lid body 800.

The second circuit board 520 is also connected with the first circuit board 510 by wiring, and transmits acquired information such as voltage, temperature and the like of the energy storage device 200 to the first circuit board 510. Since the wiring which connects the first circuit board 510 and the second circuit board 520 with each other is high-voltage wiring, a part such as a photo coupler which provides insulation between the wiring and the communication use wiring connected to the first circuit board 610 is mounted on the first circuit board 510.

As has been described above, the first circuit board 510 and the second circuit board 520 are disposed on the first wiring positioning member 301 and the second wiring positioning member 302 respectively which the wiring positioning member 300 possesses although these members 301, 302 differ from each other. That is, the first circuit board 510 and the second circuit board 520 are disposed spaced apart from each other. In this embodiment, the first circuit board 510 is formed smaller than the second circuit board 520. However, the sizes of the first circuit board 510 and the second circuit board 520 are not particularly limited. Further, shapes of the first circuit board 510 and the second circuit board 520 are not also particularly limited and may have shapes other than a rectangular shape.

The connector holding member 600 is a member for holding the connector (connector mount), and is mounted on an end portion of the wiring positioning member 300. In this embodiment, the connector holding member 600 has a first connector holding member 601 and a second connector holding member 602. The first connector holding member 601 is a connector holding member which holds connectors 910, and is mounted on an end portion of the first wiring positioning member 301 on a Y axis direction minus side. The second connector holding member 602 is a connector holding member on which connectors are not attached, and is mounted on an end portion of the second wiring positioning member 302 on a Y axis direction plus side. The connector holding member 600 is made of an insulating material such as a resin, for example.

In this embodiment, an outer surface (main surface) of the connector holding member 600 is disposed on the same plane with (coplanar with) an outer surface (side surface) of the module case 14 which is the outer case of the energy storage apparatus 1. That is, the outer surface of the first connector holding member 601 on a Y axis direction minus side (an outer surface of the connector attaching portion 620 in FIG. 8) and the outer surface of the module case 14 (the case body 100 and the lid body 800) of the unit module 11 on a Y axis direction minus side are disposed on the same plane. Further, the outer surface of the second connector holding member 602 on a Y axis direction plus side (an outer surface of the connector attaching portion 620 in FIG. 9) and the outer surface of the module case 14 (the case body 100 and the lid body 800) of the unit module 12 on a Y axis direction plus side are disposed on the same plane. The detailed configuration of the first connector holding member 601 and the second connector holding member 602 is described later.

The closing member 700 is a rectangular planar member which is detachably mounted on end portions of the wiring positioning member 300 respectively. The closing members 700 are provided for closing openings formed on the end portions of the wiring positioning member 300. The closing member 700 is made of an insulating material such as a resin, for example. In this embodiment, the first connector holding member 601, the second connector holding member 602 and the closing members 700 are made of the same material as the wiring positioning member 300. However, any one of these members may be made of a material different from the material for forming the wiring positioning member 300.

Next, the configuration of the wiring positioning member 300 (that is, the configuration of the first wiring positioning member 301 and the configuration of the second wiring positioning member 302) are described in detail.

Figure 5:
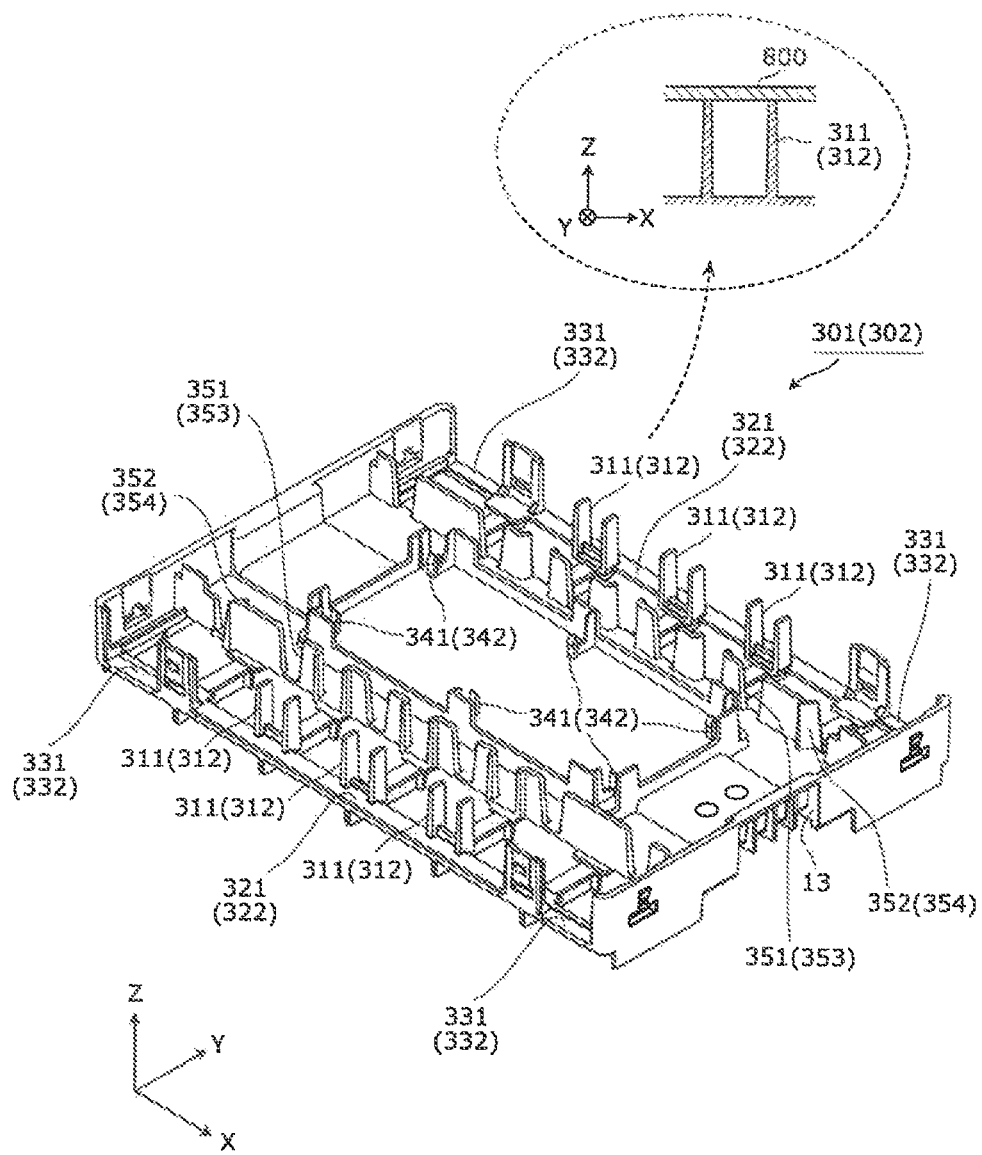
FIG. 5 is a perspective view showing an external appearance of a first wiring positioning member or a second wiring positioning member according to the embodiment of the present invention.

FIG. 5 is a perspective view showing an external appearance of the first wiring positioning member 301 (or the second wiring positioning member 302) according to the embodiment of the present invention.

Figure 6:
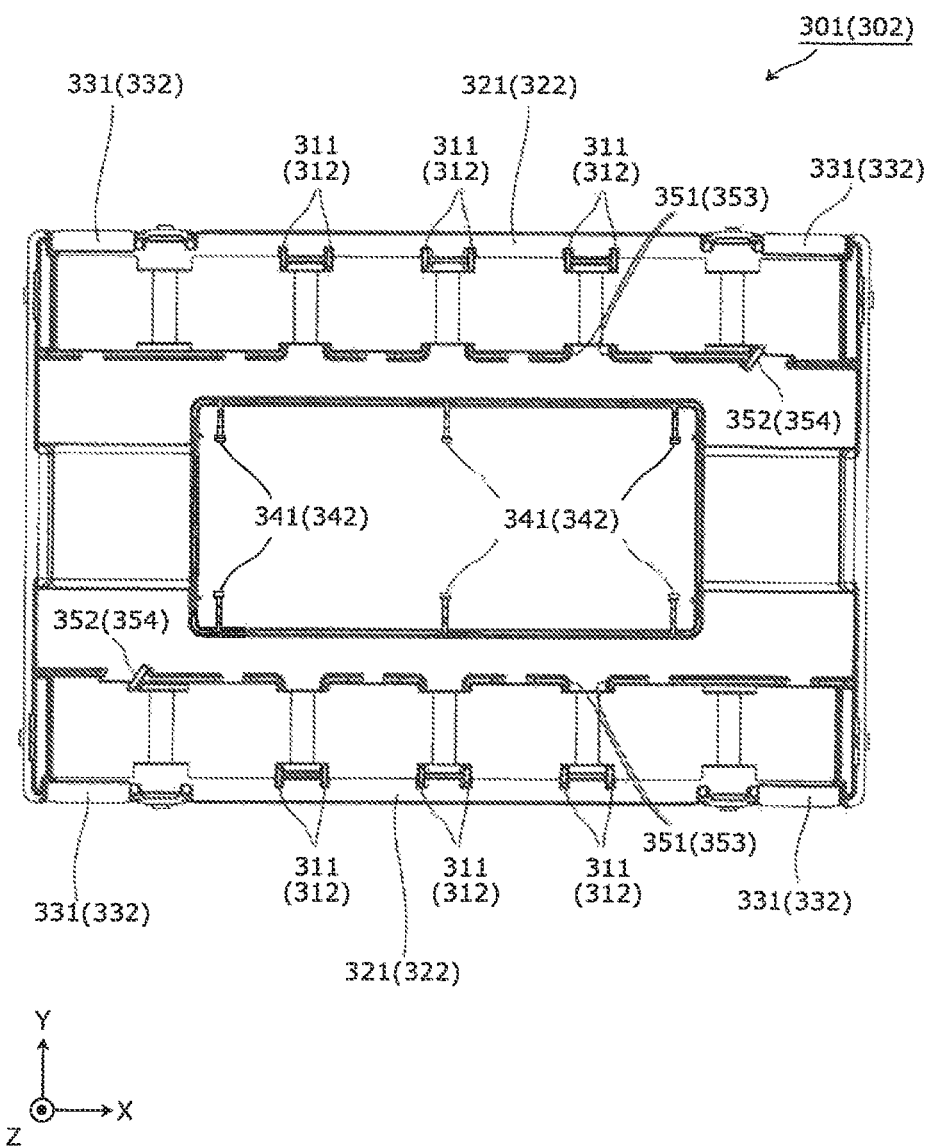
FIG. 6 is a plan view showing the configuration of the first wiring positioning member or the second wiring positioning member according to the embodiment of the present invention.

FIG. 6 is a plan view showing the configuration of the first wiring positioning member 301 (or the second wiring positioning member 302) according to the embodiment of the present invention. To be more specific, FIG. 6 is a plan view of the first wiring positioning member 301 (or the second wiring positioning member 302) shown in FIG. 5 as viewed from an upper side (a plus side in a Z axis direction).

As shown in these drawings, the first wiring positioning member 301 is a rectangular member where first guide portions 311 are integrally formed on both end portions (both end portions in the Y axis direction) of the first wiring positioning member 301 disposed opposite to each other. In this embodiment, three first guide portions 311 which are arranged parallel to each other in the X axis direction are formed on a center portion of the end portion of the first wiring positioning member 301 on a Y axis direction plus side. Further, three first guide portions 311 which are arranged parallel to each other in the X axis direction are also formed on a center portion of the end portion of the first wiring positioning member 301 on a Y axis direction minus side. The number and the arrangement positions of the first guide portions 311 may differ from the above-mentioned configuration.

The first guide portions 311 are portions formed of a plurality of upwardly projecting projections, and the wiring can be arranged between the projections. That is, the first guide portions 311 have a function of forming a path for the wiring connected to the energy storage devices 200. In this embodiment, the first guide portion 311 is formed of a pair of rectangular or a planar projections, and the wiring can be arranged between the pair of projections. However, the number and the shape of the projections are not limited to the above-mentioned configuration.

In a frame indicated by a dotted line in FIG. 5, a cross section of the first wiring positioning member 301 at the position of the first guide portions 311 is shown in a state where the lid body 800 is disposed on the first wiring positioning member 301. As shown in the drawing, the first guide portions 311 are formed such that the pair of projections is extended upward with a height that the pair of projections is brought into contact with the lid body 800. The projections of the first guide portion 311 may be formed with a height that the projections are not brought into contact with the lid body 800. However, it is preferable to form the projections with a height that the projections are substantially brought into contact with the lid body 800 such that a gap of approximately 1 cm, and more preferably 5 mm be formed between the projections and the lid body 800. It is unnecessary that all first guide portions 311 have the above-mentioned configuration, and it is sufficient that some first guide portions 311 have the above-mentioned configuration. That is, a tip of at least one first guide portion 311 out of the plurality of first guide portion 311 and the lid body 800 are in contact or adjacently face to each other.

With such a configuration, it is possible to prevent the wiring arranged between the pair of projections of the first guide portion 311 from being removed from the first guide portion 311. That is, it is not always the case that the wiring is soft and hence, there is a possibility that the wiring jumps out from the first guide portion 311. However, a height of the projections of the first guide portion 311 is close to the height of the lid body 800 and hence, it is possible to prevent the wiring from jumping out from the first guide portion 311.

The first guide portion 311 has a height five times as large as a wire diameter of the wiring, for example. Also with such configuration, it is possible to prevent the wiring from jumping out from the first guide portion 311 and being removed from the first guide portion 311.

One opening portion 321 and two opening portions 331 which are arranged at positions sandwiching the opening portion 321 therebetween are respectively formed on both end portions (both end portions in the Y axis direction) of the first wiring positioning member 301 disposed opposite to each other. The opening portion 321 is a rectangular large opening which is formed so as to cover three first guide portions 311, and the connector holding member 600 or the bus bar 400 can be disposed in the opening portion 321. The opening portion 331 is a small rectangular opening formed on both sides (both sides in the X axis direction) of three first guide portions 311, and the positive electrode external terminal 11a, the negative electrode external terminal 11b, the bus bar 400 or the closing member 700 can be disposed in the opening portions 331.

A plurality of protrusions 341 are formed on a center portion of the first wiring positioning member 301 for placing and fixing the circuit board. In this embodiment, six protrusions 341 are formed. However, the first circuit board 510 having a relatively small size is placed on the first wiring positioning member 301 and hence, four protrusions 341 are used. That is, four protrusions 341 are inserted into through holes formed in four corners of the first circuit board 510 so that the first circuit board 510 is fixed to the center portion of the first wiring positioning member 301.

Further, on the first wiring positioning member 301, partition walls 351, 352 for guiding the wiring connected to the electrode terminals of the energy storage devices 200 from the electrode terminals are formed. The partition walls 351, 352 are walls provided for forming openings which are disposed between positions at which the electrode terminals are arranged and a position at which the circuit board is arranged corresponding to the respective electrode terminals of the energy storage devices 200. The partition walls 352 are arranged corresponding to the electrode terminals positioned at opposing corner portions of the first wiring positioning member 301, and the partition walls 351 are arranged corresponding to the electrode terminals other than the electrode terminals corresponding to the opposing corner portions.

The partition walls 351 are walls for forming the openings penetrating in a direction from the end portion toward the center portion of the first wiring positioning member 301 (Y axis direction). The partition walls 352 are walls for forming the openings penetrating in a direction from the corner portions toward the center portion of the first wiring positioning member 301 (for example, in a direction inclined by 30° with respect to the Y axis direction). With such a configuration, the plurality of partition walls 351, 352 are arranged at a rotationally symmetric position (in a point symmetry with respect to the center of the wiring positioning member 301) when the plurality of partition walls 351, 352 are rotated about the center of the first wiring positioning member 301. The first guide portions 311 (or the second guide portions 312) are also arranged at a rotationally symmetric position similar to the partition walls 351, 352. That is, the first wiring positioning member 301 has the rotationally symmetric configuration when the first wiring positioning member 301 is rotated about the center thereof (a point symmetric configuration with respect to the center thereof).

The above-mentioned discharge portion 13 is formed in the first wiring positioning member 301. The discharge portion 13 is formed on the end portion of the first wiring positioning member 301 on a side where the first guide portions 311 are not formed. Due to the discharge portion 13, a gas released from the gas release valves of the energy storage devices 200 can be discharged to the outside of the energy storage apparatus 1.

The second wiring positioning member 302 also has substantially the same configuration as the first wiring positioning member 301. That is, the second wiring positioning member 302 includes second guide portions 312 each having substantially the same configuration as the first guide portion 311. In the second wiring positioning member 302, openings 322, 332 having substantially the same configuration as the openings 321, 331 are formed. Further, protrusions 342 each having substantially the same configuration as the protrusion 341 are formed on the second wiring positioning member 302. Since the second circuit board 520 is placed on the second wiring positioning member 302, the six protrusions 342 are inserted into six through holes formed in the second circuit board 520 so that the second circuit board 520 is fixed to a center portion of the second wiring positioning member 302. The second wiring positioning member 302 includes partition walls 353, 354 respectively having substantially the same configurations as the partition walls 351, 352.

The first guide portions 311 also have a function of positioning the first connector holding member 601 on the first wiring positioning member 301 at the time of mounting the first connector holding member 601 on the first wiring positioning member 301. Similarly, the second guide portions 312 also have a function of positioning the second connector holding member 602 on the second wiring positioning member 302 at the time of mounting the second connector holding member 602 on the second wiring positioning member 302. That is, out of these plurality of guide portions, some guide portions position the connector holding member, and some of other guide portions form paths for the wiring. Such a configuration is described in detail hereinafter.

Figure 7:
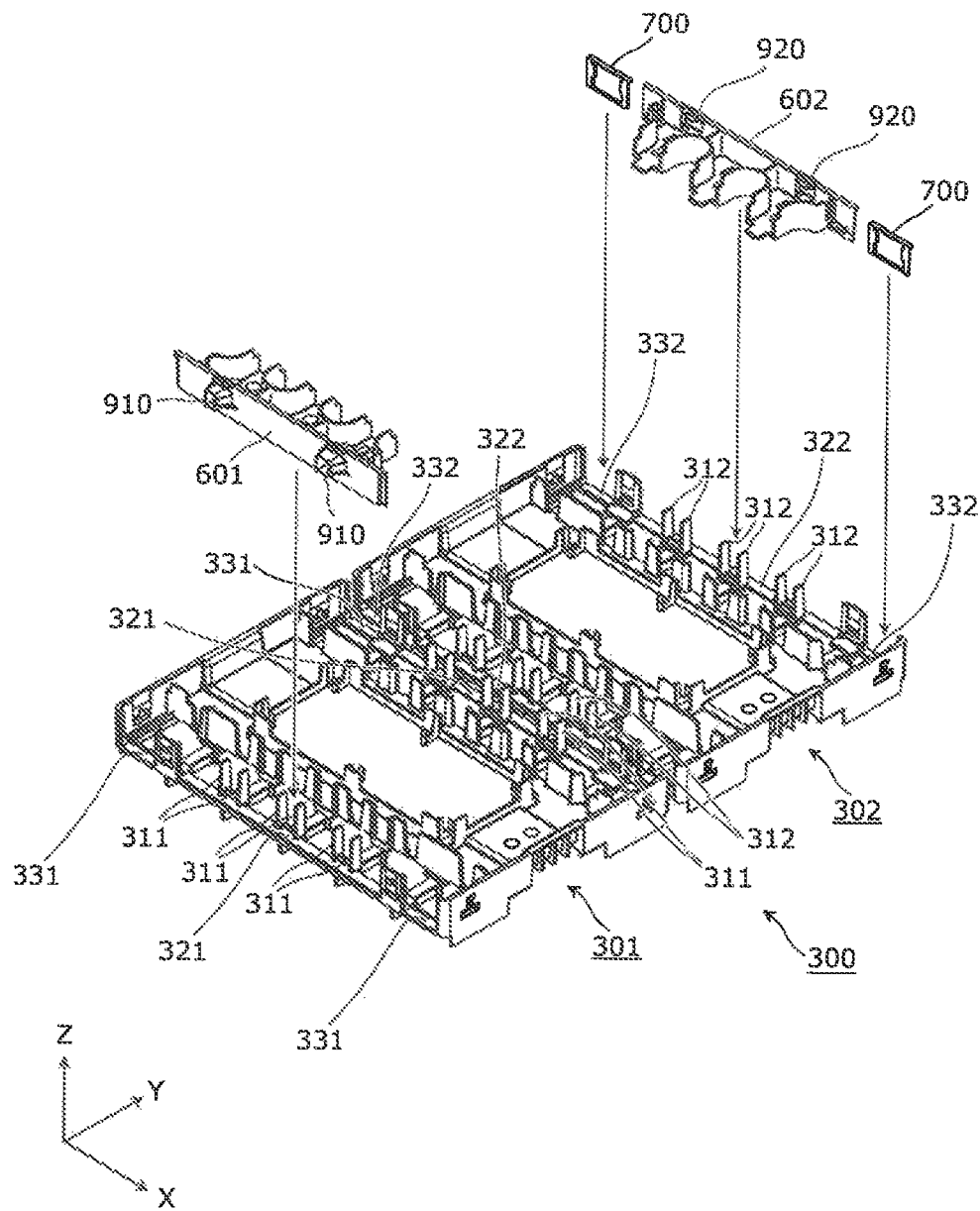
FIG. 7 is a perspective view showing the configuration where a first connector holding member, a second connector holding member, and closing members are mounted on the wiring positioning member according to the embodiment of the present invention.

FIG. 7 is a perspective view showing the configuration where the first connector holding member 601, the second connector holding member 602, and the closing members 700 are mounted on the wiring positioning member 300 (the first wiring positioning member 301 and the second wiring positioning member 302) according to the embodiment of the present invention.

As shown in FIG. 7, the connector holding member 600 is positioned by the guide portions of the wiring positioning member 300, and is detachably mounted on the wiring positioning member 300. To be more specific, the wiring positioning member 300 includes: the first wiring positioning member 301 having the first guide portions 311 as the guide portions; and the second wiring positioning member 302 having the second guide portions 312 as the guide portions. The first connector holding member 601 is inserted into the opening portion 321 of the first wiring positioning member 301, is positioned by the first guide portions 311, and is detachably mounted on the first wiring positioning member 301. The second connector holding member 602 is inserted into the opening portion 322 of the second wiring positioning member 302, is positioned by the second guide portions 312, and is detachably mounted on the second wiring positioning member 302.

The first connector holding member 601 is positioned by the first guide portions 311 disposed on the end portion of the first wiring positioning member 301 on a Y axis direction minus side (an end portion of the wiring positioning member 300 on a Y axis direction minus side). On the other hand, the second connector holding member 602 is positioned by the second guide portions 312 on the end portion of the second wiring positioning member 302 on a Y axis direction plus side (an end portion of the wiring positioning member 300 on a Y axis direction plus side). That is, it is safe to say that the wiring positioning member 300 is a rectangular member where the guide portions (first guide portions 311 and the second guide portions 312) are integrally formed on both opposing end portions (both end portions in the Y axis direction) of the rectangular member respectively. The first connector holding member 601 is positioned by the guide portions (first guide portions 311) formed on one end portion of the wiring positioning member 300 (end portion on a Y axis direction minus side). The second connector holding member 602 is positioned by the guide portions (second guide portions 312) formed on the other end portion of the wiring positioning member 300 (end portion on a Y axis direction plus side).

The first guide portion 311 formed on the end portion of the first wiring positioning member 301 on a Y axis direction plus side and the second guide portion 312 formed on the end portion of the second wiring positioning member 302 on a Y axis direction minus side are disposed adjacently to each other. A straight shaped path of the wiring is formed by the first guide portion 311 and the second guide portion 312 disposed adjacently to each other. In this manner, the path of the wiring is formed by the first guide portion 311 and the second guide portion 312 which opposedly face each other with a boundary between the first wiring positioning member 301 and the second wiring positioning member 302 interposed therebetween.

The opening portions 321, 331 of the first wiring positioning member 301 on a Y axis direction plus side and the opening portions 322, 332 of the second wiring positioning member 302 on a Y axis direction minus side are disposed adjacently to each other. The bus bars 400 are disposed such that the bus bars 400 stride over the opening portions 321, 331 and the opening portions 322, 332 disposed adjacently to each other.

The closing member 700 is detachably inserted in two opening portions 332 of the second wiring positioning member 302 on a Y axis direction plus side respectively. The positive electrode external terminal 11a and the negative electrode external terminal 11b are inserted in two opening portions 331 of the first wiring positioning member 301 on a Y axis direction minus side respectively. That is, the closing members 700 are members for closing the opening portion 331 or 332 into which the positive electrode external terminal 11a, the negative electrode external terminal 11b, or the bus bar 400 is not inserted.

Next, the configuration of the connector holding member 600 (the first connector holding member 601 and the second connector holding member 602) is described in detail.

Figure 8:
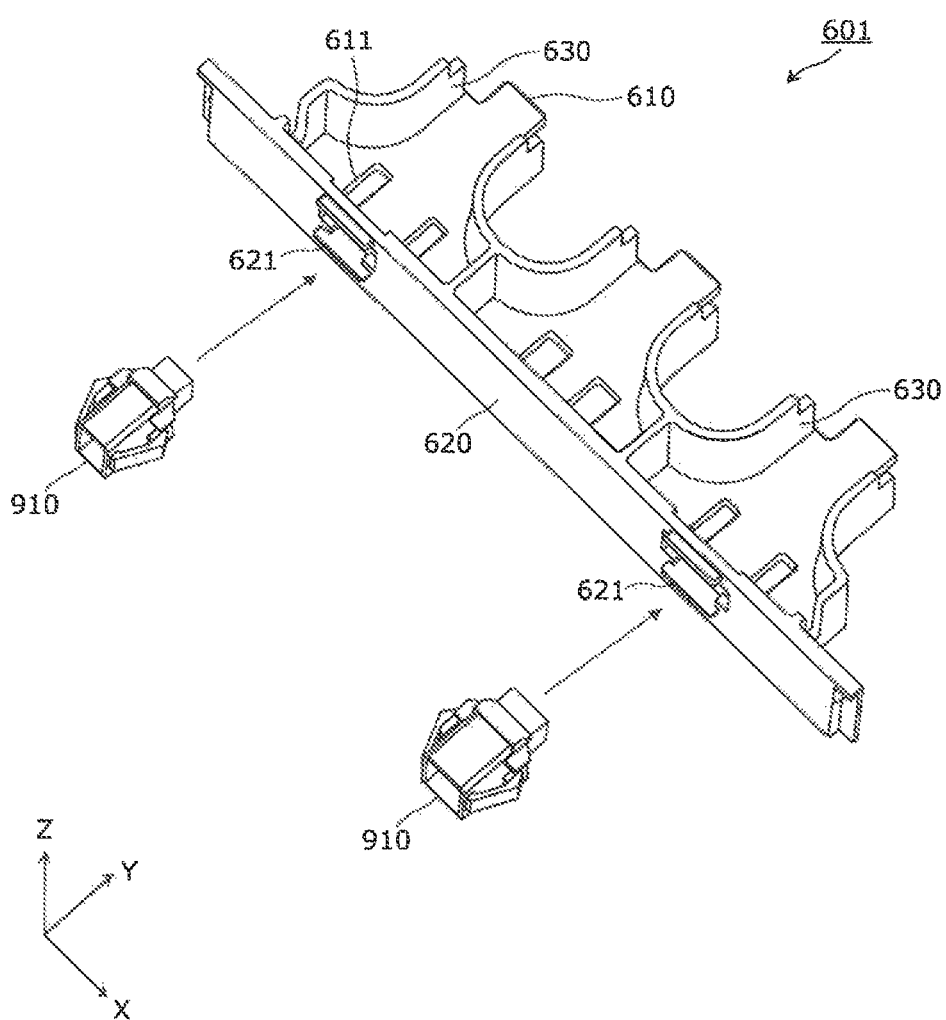
FIG. 8 is a perspective view showing the configuration of the first connector holding member according to the embodiment of the present invention.
Figure 9:
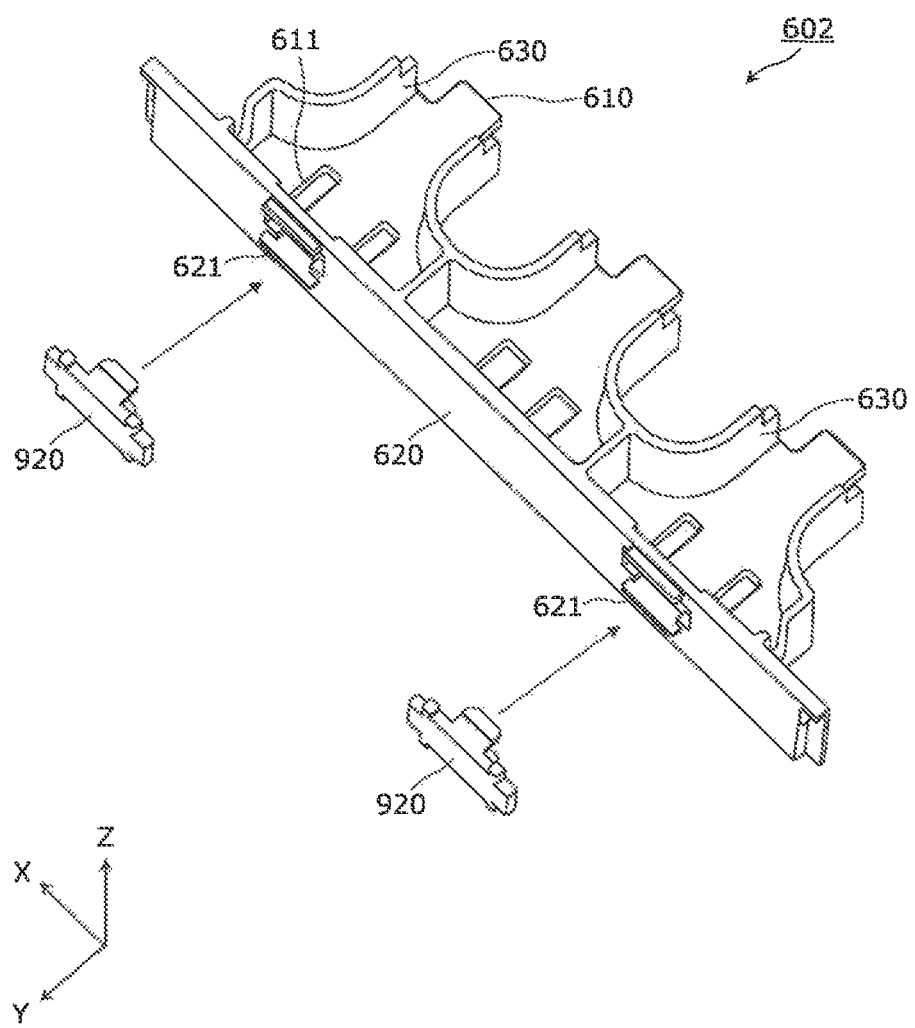
FIG. 9 is a perspective view showing the configuration of the second connector holding member according to the embodiment of the present invention.

FIG. 8 is a perspective view showing the configuration of the first connector holding member 601 according to the embodiment of the present invention. FIG. 9 is a perspective view showing the configuration of the second connector holding member 602 according to the embodiment of the present invention.

First, as shown in FIG. 8, the first connector holding member 601 has a bottom wall portion 610, a connector attaching portion 620, and side wall portions 630.

The bottom wall portion 610 is a planar portion disposed on a bottom portion of the first connector holding member 601. Guide portion insertion ports 611 which are rectangular through holes into which the guide portions of the wiring positioning member 300 are inserted are formed in the bottom wall portion 610. That is, by inserting the first guide portions 311 of the first wiring positioning member 301 into the guide portion insertion ports 611 of the bottom wall portion 610, the first connector holding member 601 is detachably mounted on the first wiring positioning member 301. In this embodiment, six guide portion insertion ports 611 arranged parallel to each other in the X axis direction are formed in the first connector holding member 601 corresponding to six projections which the three first guide portions 311 arranged parallel to each other in the X axis direction have. In this embodiment, although the plurality of guide portions of the wiring positioning member 300 are inserted into the guide portion insertion ports 611, the first connector holding member 601 may be configured such that only one guide portion is inserted into the guide portion insertion port.

The connector attaching portion 620 is a rectangular and planar portion disposed on a front surface of the first connector holding member 601. Connector attaching ports 621 which are rectangular through holes in which the connectors 910 can be respectively attached to are formed in the connector attaching portion 620. That is, by attaching the connectors 910 in the connector attaching ports 621 of the connector attaching portion 620, the connectors 910 are detachably attached on the first connector holding member 601. In this embodiment, two connector attaching ports 621 arranged parallel to each other in the X axis direction are formed corresponding to two connectors 910.

The side wall portions 630 are curved wall portions for guiding the wiring connected to the connector 910. That is, when the wiring extending from the connector 910 is connected to the first circuit board 510, the wiring is arranged along the curved side wall portion 630.

By connecting the wiring disposed outside the energy storage apparatus 1 to the connector 910, the inside and the outside of the energy storage apparatus 1 are connected to each other. For example, the connector 910 includes an input-use connector for transmitting an electric signal transmitted from the wiring disposed outside the energy storage apparatus 1 to the wiring disposed inside the energy storage apparatus 1, and an output-use connector for transmitting an electric signal from the wiring disposed inside the energy storage apparatus 1 to the wiring disposed outside the energy storage apparatus 1. In this case, two connectors 910 may have the same shape, or may have different shapes. In the case where only one connector 910 is attached to the first connector holding member 601, a cover member 920 described later may be attached to the connector attaching port 621 on which the connector 910 is not attached.

As shown in FIG. 9, the second connector holding member 602 has substantially the same configuration as the first connector holding member 601. That is, the second connector holding member 602 has a bottom wall portion 610, a connector attaching portion 620, and side wall portions 630 similar to the first connector holding member 601.

Guide portion inserting ports 611 are formed in the bottom wall portion 610. By inserting the second guide portions 312 of the second wiring positioning member 302 into the guide portion inserting ports 611, the second connector holding member 602 is detachably mounted on the second wiring positioning member 302. Connector attaching ports 621 are formed in the connector attaching portion 620. In this embodiment, the connector 910 is not attached to the connector attaching port 621 and hence, two cover members 920 are respectively mounted in two connector attaching ports 621. In this manner, the second connector holding member 602 is a member having the same shape as the first connector holding member 601 and having the openings which are closed by the cover members 920 although in which connectors are attached.

Next, the paths of the wirings disposed on the wiring positioning member 300 (the first wring positioning member 301 and the second wiring positioning member 302) are described in detail.

Figure 10:
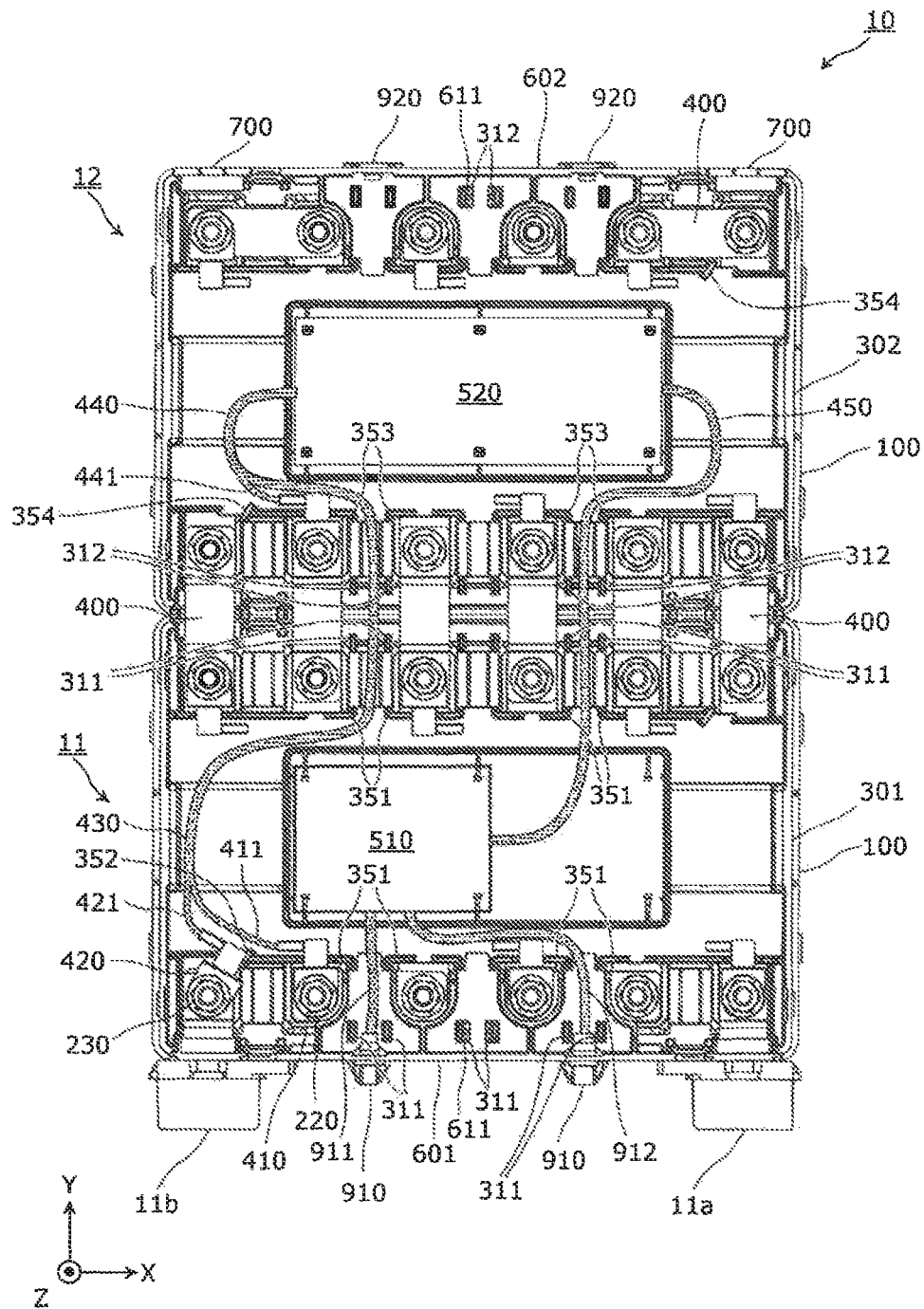
FIG. 10 is a plan view showing paths of wirings positioned on the wiring positioning member according to the embodiment of the present invention.

FIG. 10 is a plan view showing the paths of the wirings positioned on the wiring positioning member 300 (the first wiring positioning member 301 and the second wiring positioning member 302) according to the embodiment of the present invention. To be more specific, FIG. 10 is a plan view showing a state where the lid body 800 is removed from the module group 10 as viewed from above (a plus side in the Z axis direction) as shown in FIG. 3.

As shown in FIG. 10, wirings 911, 912 are connected to two connectors 910, and the wirings 911, 912 are connected to the first circuit board 510 through the first connector holding member 601. In this embodiment, the wirings 911, 912 pass through between projections of the first guide portions 311 and through between the walls of the partition wall 351. That is, in this case, the first guide portion 311 and the partition walls 351 function as parts forming the paths of the wirings. In this embodiment, for example, the wiring 911 is an input-use communication wiring, and the wiring 912 is an output-use communication wiring.

Wirings 411 are connected to the positive electrode terminals 220 of the energy storage devices 200 disposed in the inside of the unit module 11 by way of connecting members 410. In the drawings, the wiring 411 is connected to one positive electrode terminal 220. However, in this embodiment, all (six) positive electrode terminals 220 are connected to the connecting members 410, and the wirings 411 are connected to the positive electrode terminals 220 by way of the respective connecting members 410. The wirings are not limited to the configuration where the wirings 411 are connected to all positive electrode terminals 220, and it is sufficient that the wiring 411 be connected to at least one positive electrode terminal 220. In this embodiment, the wirings 411 are voltage measurement-use wirings, for example.

Wirings 421 are connected to the negative electrode terminals 230 on a negative electrode external terminal 11b side via connecting members 420. That is, for measuring voltages of the energy storage apparatuses 1, voltage measurement-use wirings are connected not only to the positive electrode terminals 220 on a positive electrode external terminal 11a side but also to the negative electrode terminals 230 on a negative electrode external terminal 11b side. That is, the wirings 421 are voltage measurement-use wirings.

All of the wirings 411 and the wirings 421 in the inside of the unit module 11 are bundled thus forming a wiring group 430. The wiring group 430 extends to the second circuit board 520 via the path of the wiring formed of the first guide portions 311 and the second guide portions 312 on an X axis direction minus side. The wiring group 430 passes through between the walls of the partition wall 351 and between the walls of the partition wall 353. That is, the partition walls 351, 353 also function as a part of the path of the wiring.

Wirings (for example, wirings 441 in FIG. 10) are connected also to the positive electrode terminals 220 of the energy storage devices 200 disposed in the inside of the unit module 12, and are merged with the wiring group 430 in bundle thus forming a wiring group 440. Then, the wiring group 440 is connected to the second circuit board 520.

A wiring 450 is connected to the second circuit board 520, and the wiring 450 is connected to the first circuit board 510 via the path of the wiring formed by the first guide portions 311 and the second guide portions 312 on an X axis direction plus side. In this embodiment, the wiring group 450 passes through between the walls of the partition wall 351 and through between the walls of the partition wall 353. That is, also in this case, the partition walls 351, 353 function as a part of the path of the wiring.

As described above, the wirings 430, 450 are disposed in the paths of the wirings inside the first guide portions 311 and the second guide portions 312, while the bus bars 400 are disposed outside the first guide portions 311 and the second guide portions 312. With such a configuration, the bus bars 400 (high-voltage portions of a main circuit) and the wirings ow-voltage portions) for communication use and measurement use can be disposed apart from each other.

The partition walls 351, 353 have an approximately L shape as viewed in a top plan view, and a corner portion of the L shape is rounded thus being formed into a round curved surface. With such a configuration, when the partition walls 351, 353 form the paths of the wirings, it is possible to prevent the wiring from being damaged by the paths of the wirings by being brought into contact with the L-shape corner portions. The partition walls 351, 353 are not limited to members which are used for forming the paths of the wirings. For example, the partition walls 361, 353 also have the following functions.

That is, a distal end of the connecting member 410 is inserted into an opening formed by the pair of walls of the partition wall 351, and a distal end portion of the connecting member 420 is inserted into an opening formed by the pair of walls of the partition wall 352. In this embodiment, the partition walls 351, 352 have a function of preventing the connecting members 410, 420 from being rotated at the time of mounting the connecting members 410, 420 on the electrode terminals of the energy storage devices 200. In this embodiment, the distal end portions of the connecting members 410, 420 respectively have an L shape. Accordingly, although the opening formed by the partition wall 351 is formed in a penetrating manner in a Y axis direction, the opening formed by the partition wall 352 is formed in a penetrating manner in a direction inclined with respect to the Y axis direction. This is because that, in the case where the opening formed by the partition wall 352 is formed in a penetrating manner in the Y axis direction, it is difficult to insert the connecting member 420 having the distal end portion to which the wiring 421 is connected into the opening.

The first connector holding member 601 is positioned by inserting the first guide portions 311 into the guide portion inserting ports 611. The first connector holding member 601 is positioned also by disposing each distal end portion (the end portion on a Y axis direction plus side) of the first connector holding member 601 between two partition walls 351. The same is applicable also to the second connector holding member 602.

In this embodiment, the unit modules 11, 12 respectively form a unit in which the energy storage devices 200 are housed in the module case 14. That is, in the unit modules 11, 12, the energy storage devices 200 are housed in a row in a state where long side surfaces of the energy storage devices 200 face each other (in a direction orthogonal to a straight line which connects the positive electrode terminal and the negative electrode terminal to each other). The unit modules 11, 12 are connected to each other in a direction along the long side surfaces of the energy storage devices 200 (a direction along a straight line which connects the positive electrode terminal and the negative electrode terminal to each other). In this embodiment, the electrical connection between the unit modules is established as follows. As shown in FIG. 4 and FIG. 10, first, the energy storage device 200 on an end of the unit module 11 and the energy storage device 200 on an end of the unit module 12 are connected to each other in series. Next, the energy storage devices 200 disposed adjacently to each other in the inside of the unit module 12 are connected to each other in series. Next, the energy storage device 200 disposed in the inside of the unit module 12 and the energy storage device 200 disposed in the inside of the unit module 11 are connected to each other in series. Next, the energy storage devices 200 disposed adjacently to each other in the inside of the unit module 11 are connected to each other in series. By repeating such connections, all energy storage devices 200 in the unit module 11 and the unit module 12 are connected to each other in series.

As has been described heretofore, the energy storage apparatus 1 according to the embodiment of the present invention includes: the wiring positioning member 300 which includes the guide portions (the first guide portions 311 and the second guide portions 312) which form the paths of the wirings, and the partition walls 351 to 354; and the connector holding member 600. The connector holding member 600 is positioned by the guide portions, and is detachably mounted on the wiring positioning member 300. In other words, out of the plurality of guide portions, some guide portions are used for positioning the connector holding member 600, and some of other guide portions are used for forming the paths of the wirings. That is, the guide portions perform both the function of forming the paths of the wirings and the function of positioning the connector holding member 600. Accordingly, due to the formation of the guide portions, it is unnecessary to form two kinds of portions consisting of a portion for forming the paths of the wirings and a portion for positioning the connector holding member 600. Accordingly, the configuration necessary for positioning the wiring can be simplified.

The first guide portions 311 of the first wiring positioning member 301 and the second guide portions 312 of the second wiring positioning member 302 are disposed adjacently to each other. That is, the paths of the wirings are formed by the first guide portions 311 of the first wiring positioning member 301 and the second guide portions 312 of the second wiring positioning member 302. In this manner, by forming the paths of the wirings by disposing the guide portions of two wiring positioning members adjacently to each other, the wiring can be easily made to pass through between two wiring positioning members without using additional members.

The first guide portions 311 and the second guide portions 312 can position the connector holding member 600 by the plurality of projections and can form the paths of the wirings.

The energy storage apparatus 1 includes the first connector holding member 601 with which the connectors 910 are attached, and the second connector holding member 602 which has the same shape as the first connector holding member 601 and has the closed connector attaching ports 621. That is, with the use of the connector holding member having the same shape also on a side where the connector is not disposed, the configuration of the energy storage apparatus 1 can be simplified.

The first connector holding member 601 is positioned by the guide portions (first guide portions 311) which are provided at one end portion of the wiring positioning member 300, and the second connector holding member 602 is positioned by the guide portions (second guide portions 312) which are provided at the other end portion of the wiring positioning member 300. That is, by imparting a function of positioning the first connector holding member 601 to one guide portions and by imparting a function of positioning the second connector holding member 602 to other guide portions, the configuration of the energy storage apparatus 1 can be simplified.

Further, the tips of the first guide portions 311 and the second guide portions 312 and the lid body 800 are in contact or adjacently face to each other and hence, it is possible to prevent the wirings positioned by the first guide portions 311 and the second guide portions 312 from jumping from the first guide portions 311 and the second guide portions 312 and being removed from the guide portions 311, 312.

By using the wiring positioning member 300 as the pressing member which presses the energy storage devices 200, the configuration of the energy storage apparatus 1 can be simplified.

The guide portion inserting ports 611 which are through holes through which the guide portions are inserted are formed in the connector holding member 600 and hence, the guide portions can be easily mounted on the connector holding member 600.

The outer surface of the connector holding member 600 and the outer surface of the module case 14 which forms the outer case are disposed coplanar and hence, a cover which covers the outer surface of the connector holding member 600 and the outer surface of the outer case can be easily mounted.

The plurality of first guide portions 311 and the plurality of partition walls 351, 352 (or the second guide portions 312 and the partition walls 353, 354) are disposed at a rotationally symmetric position and hence, in mounting the member (wiring positioning member 300) to which the guide portions and the partition walls are provided, an error in determining a mounting direction can be suppressed.

The first circuit board 510 to which the wirings which are connected to the energy storage devices 200 are connected, and the second circuit board 520 to which the wirings which are connected to the connectors 910 are connected are disposed apart from each other. In such a configuration, the wirings which are connected to the energy storage devices 200 are high-voltage wirings such as voltage measurement use wirings, and the wirings which are connected to the connector 910 are low-voltage wirings such as communication use wirings (control use wirings). Accordingly, the second circuit board 520 to which the low-voltage wirings are connected is disposed apart from the first circuit board 510 to which the high-voltage wirings are connected and hence, the low-voltage wirings can be easily insulated from the high-voltage wirings whereby the configuration for positioning the wirings can be simplified.

The second circuit board 520 is disposed at the member different from the member at which the first circuit board 510 is disposed and hence, the low-voltage wiring can be insulated from the high-voltage wiring more easily.

Although the energy storage apparatus 1 according to the embodiment of the present invention have been described heretofore, the present invention is not limited to the above-mentioned embodiment. That is, it should be construed that the embodiment disclosed in this specification is only for an exemplifying purpose in all aspects and are not limited. The scope of the present invention is not designated by the above-mentioned description but is designated by Claims, and it is intended that all changes which fall within the meaning and the scope equivalent to Claims are also included in the scope of the present invention.

For example, in the above-mentioned embodiment, the wiring positioning member 300 is formed of two members formed of the first wiring positioning member 301 and the second wiring positioning member 302. However, the wiring positioning member 300 may be formed of one member or may be formed of three or more members. Such configurations also can acquire substantially the same advantageous effects as the above-mentioned embodiment. The specific configurations are described hereinafter.

Figure 11:
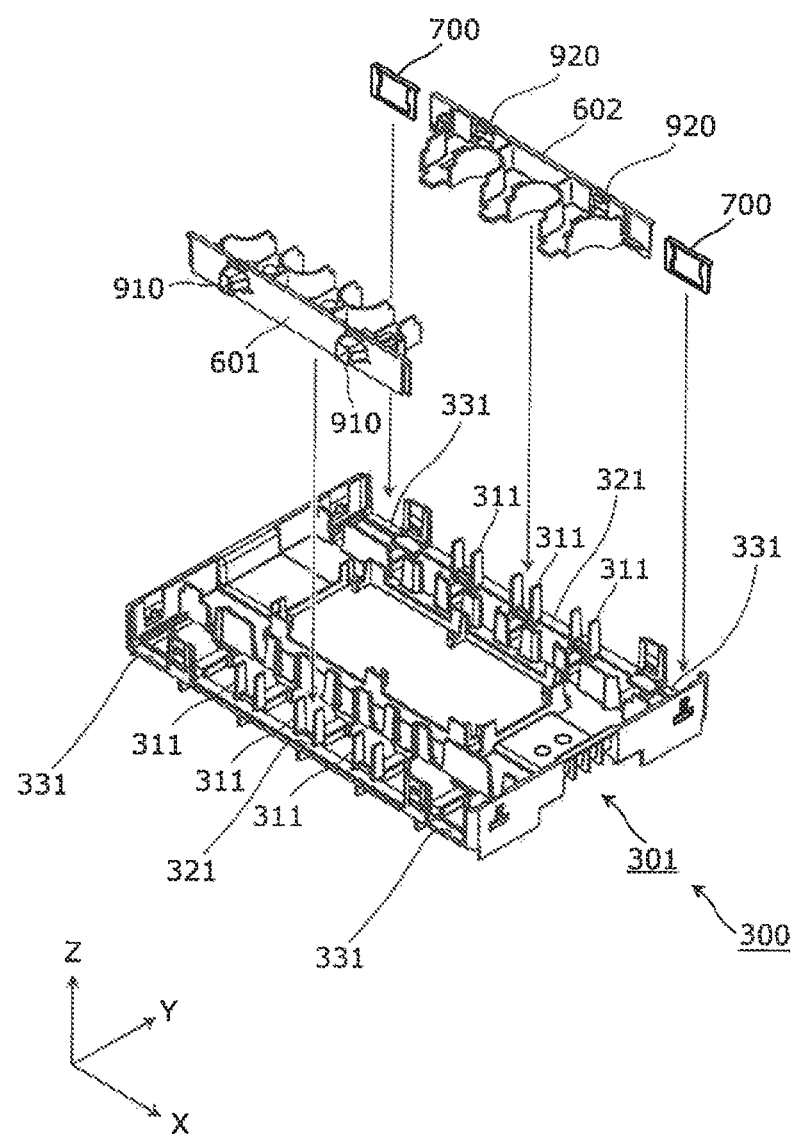
FIG. 11 is a perspective view showing the configuration where a first connector holding member, a second connector holding member, and a closing member are mounted on a wiring positioning member according to a modification 1 of the embodiment of the present invention.
Figure 12:
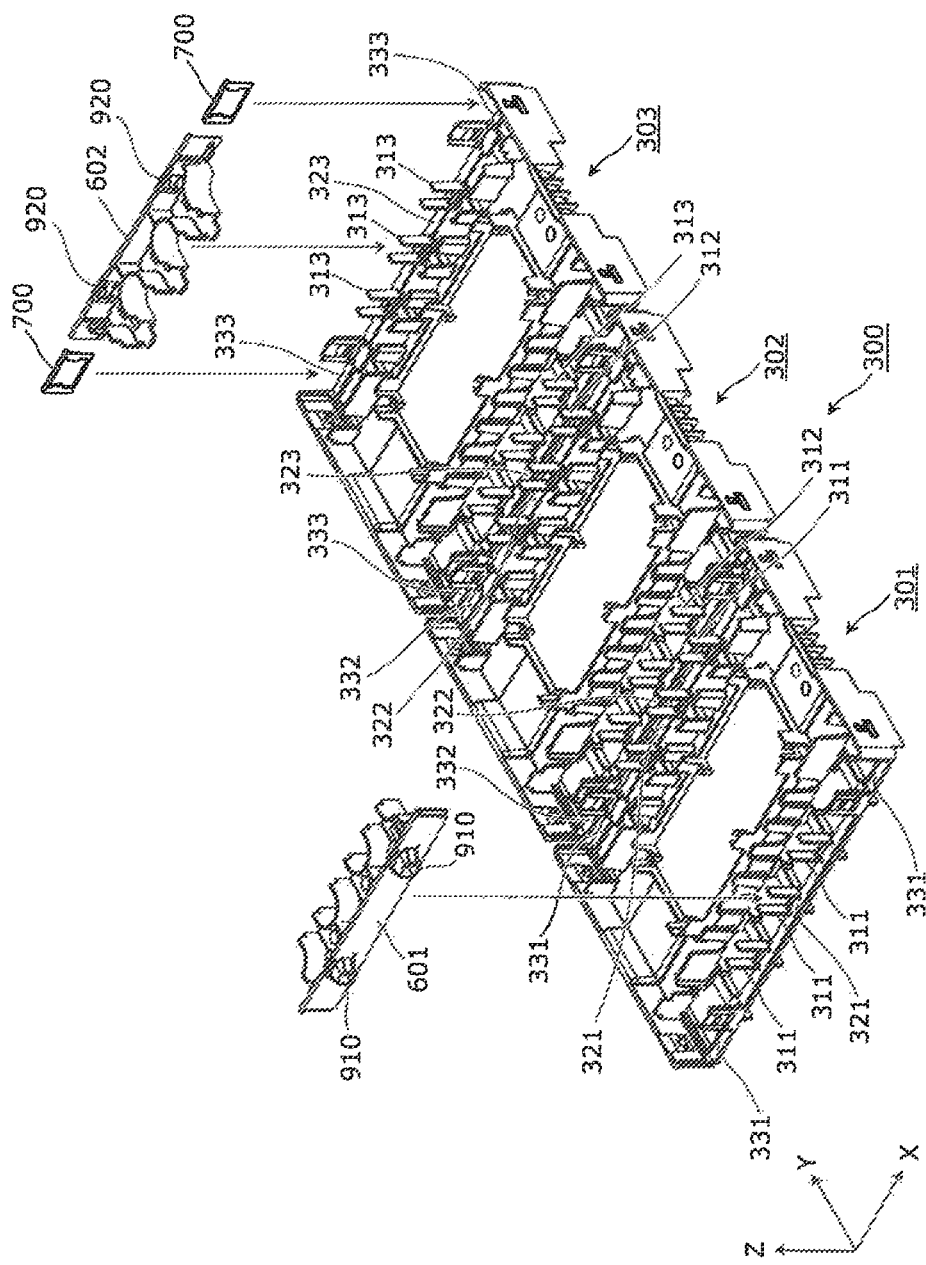
FIG. 12 is a perspective view showing the configuration where a first connector holding member, a second connector holding member, and a closing member are mounted on a wiring positioning member according to a modification 2 of the embodiment of the present invention.

FIG. 11 is a perspective view showing the configuration where a first connector holding member 601, a second connector holding member 602, and a closing member 700 are mounted on a wiring positioning member 300 according to a modification 1 of the embodiment of the present invention. FIG. 12 is a perspective view showing the configuration where a first connector holding member 601, a second connector holding member 602, and a closing member 700 are mounted on a wiring positioning member 300 according to a modification 2 of the embodiment of the present invention.

Firstly, as show in FIG. 11, the wiring positioning member 300 includes one first wiring positioning member 301, and the first connector holding member 601, the second connector holding member 602, and the closing member 700 are mounted on both end portions of the first wiring positioning member 301. That is, in this case, the energy storage apparatus 1 includes only one unit module. To be more specific, the first connector holding member 601 is positioned at and is detachably mounted on the first guide portion 311 of one end portion of the first wiring positioning member 301, and the second connector holding member 602 is positioned at and is detachably mounted on the first guide portion 311 of the other end portion of the first wiring positioning member 301.

As shown in FIG. 12, the wiring positioning member 300 includes three members formed of the first wiring positioning member 301, the second wiring positioning member 302, and the third wiring positioning member 303. The first connector holding member 601 is mounted on an end portion of the first wiring positioning member 301, and the second connector holding member 602 and the closing member 700 are mounted on the end portion of the third wiring positioning member 303. That is, in this case, the energy storage apparatus 1 includes three unit modules.

To be more specific, the first connector holding member 601 is positioned at and is detachably mounted on the first guide portion 311 disposed at an end portion of the first wiring positioning member 301 on a Y axis direction minus side. The second connector holding member 602 is positioned at and is detachably mounted on the third guide portion 313 disposed at an end portion of the third wiring positioning member 303 on a Y axis direction plus side. The closing member 700 is mounted on the opening portions 323, 333 disposed at an end portion of the third wiring positioning member 303 on a Y axis direction plus side.

The second guide portion 312 disposed at an end portion of the second wiring positioning member 302 on a Y axis direction plus side and the third guide portion 313 disposed at an end portion of the third wiring positioning member 303 on a Y axis direction minus side are disposed adjacently to each other. A straight-line shaped path of a wiring is formed by the second guide portion 312 and the third guide portion 313 disposed adjacently to each other. In this manner, the third guide portion 313 has substantially the equal function as the first guide portion 311 and the second guide portion 312 described in the above-mentioned embodiment.

The opening portions 322, 332 of the second wiring positioning member 302 on a Y axis direction plus side and the opening portions 323, 333 of the third wiring positioning member 303 on a Y axis direction minus side are disposed adjacently to each other. The bus bar 400 is disposed in a straddling manner over the opening portions 322, 323 disposed adjacently to each other and over the opening portions 332, 333 disposed adjacently to each other respectively.

As described above, the wiring positioning member 300 may be formed of one member, may be formed of three members, or may be formed of four or more members.

When the wiring positioning member 300 is formed of a plurality of members, the arrangement of the plurality of members is not limited to a straight-line-shaped arrangement shown in FIG. 12. For example, the plurality of members of the wiring positioning member 300 may be formed in various shapes such as an L shape, a U shape, or an O shape by changing the arrangement positions of the guide portions or by connecting the positive and negative terminals to each other by the wiring instead of the bus bar. That is, the respective members which the wiring positioning member 300 includes may be connectable with other members in four directions.

In the above-mentioned embodiment, the first guide portion 311 is integrally formed on the first wiring positioning member 301, and the second guide portion 312 is integrally formed on the second wiring positioning member 302. However, the guide portion may be formed on the first wiring positioning member 301 or the second wiring positioning member 302 as a separate body. Further, the configuration may be adopted where the guide portion is formed on only either one of the first wiring positioning member 301 or the second wiring positioning member 302. In this case, out of the first connector holding member 601 and the second connector holding member 602, the connector holding member corresponding to the guide portion is positioned by the guide portion.

In the above-mentioned embodiment, the first wiring positioning member 301 and the second wiring positioning member 302 are provided as separate members from each other. However, the first wiring positioning member 301 and the second wiring positioning member 302 may be formed as one integral member.

In the above-mentioned embodiment, the first guide portion 311 and the second guide portion 312 are disposed adjacently to each other. However, the first guide portion 311 and the second guide portion 312 may be disposed at a position slightly displaced from the adjacently disposed position.

In the above-mentioned embodiment, the first connector holding member 601 and the second connector holding member 602 have a same shape. However, the first connector holding member 601 and the second connector holding member 602 may have different shapes.

In the above-mentioned embodiment, the connector attaching port 621 of the second connector holding member 602 is closed by the cover member 920. However, the cover member 920 may not be disposed on the connector attaching port 621 of the second connector holding member 602 so that the connector attaching port 621 may be in an open state.

In the above-mentioned embodiment, the wiring positioning member 300 (first wiring positioning member 301 and the second wiring positioning member 302) also functions as a pressing member which presses the energy storage devices 200. However, a pressing member may be provided as a separate body from the wiring positioning member 300.

In the above-mentioned embodiment, the guide portion insertion ports 611 which form through holes are formed in the connector holding member 600 (first connector holding member 601 and second connector holding member 602). The guide portions (first guide portion 311 and second guide portion 312) are inserted through the through holes. However, notches or recessed portions may be formed in the connector holding member 600 as guide portion insertion ports 611. The connector holding member 600 may be positioned by making the guide portion engage with the guide portion insertion port 611 or by fitting the guide portion in the guide portion insertion port 611.

In the above-mentioned embodiment, the connector attaching port 621 which forms a through hole is formed in the connector holding member 600 (first connector holding member 601 and second connector holding member 602). However, notches may be formed in the connector holding member 600 as connector attaching ports 621 in place of the through holes.

In the above-mentioned embodiment, the outer surface of the connector holding member 600 (first connector holding member 601 and second connector holding member 602) and the outer surface of the module case 14 are disposed coplanar. However, the outer surface of the connector holding member 600 and the outer surface of the module case 14 may be disposed on different planes.

For example, in FIG. 7, FIG. 11 and FIG. 12, the first connector holding member 601 and the second connector holding member 602 are mounted on the wiring positioning member 300. However, the wiring positioning member 300 may be configured such that the second connector holding member 602 is not mounted on the wiring positioning member 300.

In the above-mentioned embodiment, the wiring positioning members 300 (the first wiring positioning member 301 and the second wiring positioning member 302) have the partition walls 351 and the partition walls 352 (or the partition walls 353 and the partition walls 354, the same definition being applicable hereinafter) having different shapes at a rotationally symmetric position. However, the partition walls 351 and the partition walls 352 may not be disposed at a rotationally symmetric position. Further, the partition walls 351 and the partition walls 352 may have the same shape. In this case, the wiring positioning member 300 may have a symmetrical shape in a longitudinal direction as well as in a lateral direction. The wiring positioning member 300 may be configured to include neither the partition walls 351 nor the partition walls 352.

In the above-mentioned embodiment, the energy storage apparatus 1 includes the first circuit board 510 and the second circuit board 520. However, the energy storage apparatus 1 may be configured such that the energy storage apparatus 1 does not include either one of the first circuit board 510 or the second circuit board 520. The energy storage apparatus 1 may include one circuit board which is an integral body formed of the first circuit board 510 and the second circuit board 520.

In the above-mentioned embodiment, the first circuit board 510 and the second circuit board 520 are disposed on the first wiring positioning member 301 and the second wiring positioning member 302 which are different members from each other respectively. However, both the first circuit board 510 and the second circuit board 520 may be disposed on only either one of the first wiring positioning member 301 and the second wiring positioning member 302. The first circuit board 510 may be disposed on both the first wiring positioning member 301 and the second wiring positioning member 302 or only on the second wiring positioning member 302, and the second circuit board 520 may be disposed on both the first wiring positioning member 301 and the second wiring positioning member 302 or only on the first wiring positioning member 301.

In the above-mentioned embodiment, the connector holding members 600 (first connector holding member 601 and the second connector holding member 602) are disposed on both end portions of the wiring positioning members 300 (the first wiring positioning member 301 and the second wiring positioning member 302) in the Y axis direction. However, the connector holding members 600 may be disposed on both end portions of the wiring positioning members 300 in the X axis direction or may be disposed on a center portion of the wiring positioning members 300 in the X axis direction.

INDUSTRIAL APPLICABILITY

The present invention is applicable to an energy storage apparatus and the like where the configuration for positioning a wiring can be simplified.

DESCRIPTION OF REFERENCE SIGNS

1: energy storage apparatus
10: module group
11, 12: unit module
11a: positive electrode external terminal
11b: negative electrode external terminal
13: discharge portion
14: module case
20: lower side connecting member
30: upper side connecting member
100: case body
200: energy storage device
210: container
220: positive electrode terminal
230: negative electrode terminal
300: wiring positioning member
301: first wiring positioning member
302: second wiring positioning member
303: third wiring positioning member
311: first guide portion
312: second guide portion
313: third guide portion
321, 322, 323, 331, 332, 333: opening portion
341, 342: protrusion
351, 352, 353, 354: partition wall
400: bus bar
410, 420: connecting member
411, 421, 441, 450, 911, 912: wiring
430, 440: wiring group
510: first circuit board
520: second circuit board
600: connector holding member
601: first connector holding member
602: second connector holding member
610: bottom wall portion
611: guide portion inserting port
620: connector attaching portion
621: connector attaching port
630: side wall portion
700: closing member
800: lid body
910: connector
920: cover member

The invention claimed is:

1. An energy storage apparatus, which includes a plurality of energy storage devices, comprising:
a bus bar which connects the energy storage devices to each other;
a wiring;
a wiring positioning member which includes a plurality of guide portions;
a connector holding member,
a first circuit board to which a wiring is connected, the wiring being connected to the connector; and
a second circuit board to which a wiring is connected, the wiring being connected to an energy storage device of the plurality of energy storage devices,
wherein the first circuit board and the second circuit board are disposed apart from each other,
wherein a part of the plurality of guide portions positions the connector holding member, and
wherein an other part of the plurality of guide portions forms a path of the wiring which connects the first circuit board and the second circuit board.

2. The energy storage apparatus according to claim 1, wherein the plurality of guide portions includes a first guide portion and a second guide portion,
wherein the wiring positioning member includes:
a first wiring positioning member which includes the first guide portion; and
a second wiring positioning member which includes the second guide portion,
wherein a path of the wiring is formed by the first guide portion and the second guide portion which are opposite to each other with a boundary of the first wiring positioning member and the second wiring positioning member interposed therebetween.

3. The energy storage apparatus according to claim 1, wherein each of the plurality of guide portions includes a plurality of projections which projects upward.

4. The energy storage apparatus according to claim 1, wherein the connector holding member includes:
a first connector holding member with which a connector is attached; and
a second connector holding member, which has a same shape as the first connector holding member, has an opening, to which a connector is attachable, closed with a cover member.

5. The energy storage apparatus according to claim 4, wherein the first connector holding member is positioned by a guide portion which is provided at one end portion of the wiring positioning member, and
wherein the second connector holding member is positioned by a guide portion which is provided at an other end portion of the wiring positioning member.

6. The energy storage apparatus according to claim 1, further comprising a lid body which is disposed on the wiring positioning member, and
wherein a tip of at least one of the plurality of guide portions and the lid body are in contact or adjacently face to each other.

7. The energy storage apparatus according to claim 1, wherein the wiring positioning member comprises a pressing member which is disposed on an energy storage device of the plurality of energy storage devices and presses the energy storage device downward.

8. The energy storage apparatus according to claim 1, wherein a through hole is formed in the connector holding member, at least one of the plurality of guide portions being inserted through the through hole.

9. The energy storage apparatus according to claim 1, wherein an outer surface of the connector holding member and an outer surface of an outer case of the energy storage apparatus are disposed coplanar.

10. The energy storage apparatus according to claim 1, wherein the plurality of guide portions is disposed at a rotationally symmetric position.

11. The energy storage apparatus according to claim 1, wherein the first circuit board and the second circuit board are disposed at members which are different from each other and included in the wiring positioning member.

12. An energy storage apparatus, which includes a plurality of energy storage devices, comprising:
- a bus bar which connects the energy storage devices to each other;
- a wiring;
- a wiring positioning member which includes a plurality of guide portions; and
- a connector holding member,
- wherein a part of the plurality of guide portions positions the connector holding member,
- wherein an other part of the plurality of guide portions forms a path of the wiring, and
- wherein the connector holding member includes:
- a first connector holding member with which a connector is attached; and
- a second connector holding member, which has a same shape as the first connector holding member, has an opening, to which a connector is attachable, closed with a cover member.

* * * * *